US00RE47799E

(19) United States
(12) Reissued Patent
Henderson

(10) Patent Number: US RE47,799 E
(45) Date of Reissued Patent: Jan. 7, 2020

(54) ROOF VENTILATION APPARATUS

(71) Applicant: John C. Henderson, Springfield, PA (US)

(72) Inventor: John C. Henderson, Springfield, PA (US)

(21) Appl. No.: 15/581,654

(22) Filed: Apr. 28, 2017

Related U.S. Patent Documents

Reissue of:
(64) Patent No.: 9,022,845
Issued: May 5, 2015
Appl. No.: 12/616,988
Filed: Nov. 12, 2009

(51) Int. Cl.
*F24F 7/02* (2006.01)

(52) U.S. Cl.
CPC ..... *F24F 7/02* (2013.01); *Y10T 29/49623* (2015.01)

(58) Field of Classification Search
CPC ..... F24F 7/02; Y10T 29/49623
USPC ..... 454/250, 136, 260, 339, 364, 365, 366, 454/367; 29/897.3; 52/198, 199, 302.1, 52/302.3, 93.2, 94, 95
See application file for complete search history.

(56) References Cited

U.S. PATENT DOCUMENTS

| | | | | | |
|---|---|---|---|---|---|
| 3,036,508 | A | * | 5/1962 | Halvorson | 454/250 |
| 3,683,785 | A | * | 8/1972 | Grange | 454/250 |
| 3,949,657 | A | * | 4/1976 | Sells | 454/365 |
| 4,000,688 | A | | 1/1977 | Malott | |
| 4,201,121 | A | * | 5/1980 | Brandenburg, Jr. | 454/250 |
| 4,325,290 | A | | 4/1982 | Wolfert | |
| 4,642,958 | A | * | 2/1987 | Pewitt | 52/302.3 |
| 4,643,080 | A | | 2/1987 | Trostle | |
| 4,676,147 | A | * | 6/1987 | Mankowski | 454/365 |
| 4,817,506 | A | * | 4/1989 | Cashman | 454/365 |
| 4,907,499 | A | * | 3/1990 | James | 454/365 |
| 4,942,699 | A | | 7/1990 | Spinelli | |
| 4,957,037 | A | * | 9/1990 | Tubbesing et al. | 454/366 |
| 5,060,431 | A | * | 10/1991 | MacLeod et al. | 52/199 |
| 5,095,810 | A | | 3/1992 | Robinson | |
| 5,122,095 | A | * | 6/1992 | Wolfert | 454/365 |
| 5,295,340 | A | * | 3/1994 | Collins | 52/518 |
| 5,361,551 | A | * | 11/1994 | Post | 52/95 |
| 5,473,847 | A | * | 12/1995 | Crookston | 52/302.1 |
| 5,549,513 | A | * | 8/1996 | Thomas et al. | 454/365 |
| 5,630,752 | A | * | 5/1997 | Gubash | E04D 1/30 454/366 |
| 5,651,734 | A | | 7/1997 | Morris | |
| 5,673,521 | A | | 10/1997 | Coulton | |

(Continued)

FOREIGN PATENT DOCUMENTS

| | | | |
|---|---|---|---|
| DE | 3125868 | | 1/1983 |
| DE | 3125868 | A1 * | 1/1983 |

*Primary Examiner* — William C Doerrler
(74) *Attorney, Agent, or Firm* — Robert J. Yarbrough of Lipton, Weinberger & Husick

(57) ABSTRACT

A ventilated roof features an elongated vent having a vent opening and an elongated vent shingle supporting surface. The vent opening is in fluid communication with a slot defined by the top surface of a roof deck and communicating through the roof deck. An end cap has an end cap shingle supporting surface and is located adjacent to an end of the elongated vent. The vent and the end cap adjacent to the vent are supported in an equivalent spaced-apart relation to the top surface of the roof deck. The elongated vent shingle supporting surface, the end cap shingle supporting surface and the top surface of the roof deck provide a substantially continuous support to a shingle overlapping any two of those elements.

65 Claims, 20 Drawing Sheets

(56) References Cited

U.S. PATENT DOCUMENTS 5,676,597 A * 10/1997 Bettoli et al. ..... 454/365
5,704,834 A 1/1998 Sells
5,772,502 A * 6/1998 Smith ..... 454/365
5,832,677 A * 11/1998 Kurttila ..... E04D 13/178 52/95
5,921,863 A * 7/1999 Sells ..... 454/359
5,934,995 A 8/1999 Morris
5,946,868 A 9/1999 Morris
5,947,817 A 9/1999 Morris
6,067,759 A * 5/2000 House ..... 52/198
6,125,602 A * 10/2000 Freiborg et al. ..... 52/560
6,212,833 B1 4/2001 Henderson
6,298,613 B1 * 10/2001 Coulton et al. ..... 52/199
6,343,985 B1 * 2/2002 Smith ..... 454/365
6,346,040 B1 * 2/2002 Best ..... 454/260
6,361,434 B1 * 3/2002 Brandon ..... 454/365
D457,234 S * 5/2002 O'Hagin et al. ..... D23/393
6,447,392 B1 9/2002 Henderson
6,450,882 B1 * 9/2002 Morris et al. ..... 454/365
6,487,826 B1 * 12/2002 McCorsley et al. ..... 52/408
6,560,945 B1 * 5/2003 Carpenter ..... 52/749.12
6,578,325 B2 * 6/2003 Henderson ..... E04D 1/36 52/198
6,662,509 B2 * 12/2003 Sharp et al. ..... 52/199
6,725,609 B2 * 4/2004 Freiborg et al. ..... 52/57
6,733,381 B1 * 5/2004 Ploeger ..... F24F 13/082 454/366
6,913,530 B2 7/2005 Morris
6,918,219 B1 * 7/2005 Olson ..... 52/514
7,178,294 B2 * 2/2007 Jolitz ..... 52/43
7,182,688 B2 * 2/2007 Coulton ..... 454/365
7,219,473 B2 * 5/2007 Mantyla et al. ..... 52/198
7,328,534 B2 * 2/2008 Dinwoodie ..... H01L 31/052 52/173.3
7,384,331 B2 * 6/2008 Coulton ..... 454/365
7,422,520 B2 * 9/2008 Coulton et al. ..... 454/365
7,662,037 B2 * 2/2010 Polston ..... 454/365
7,921,606 B2 * 4/2011 Quaranta et al. ..... 52/57
8,069,621 B2 * 12/2011 Mantyla et al. ..... 52/198
8,292,707 B2 * 10/2012 Grisham et al. ..... 454/260
8,607,510 B2 * 12/2013 Daniels ..... 52/173.3
8,707,643 B1 * 4/2014 Kalkanoglu et al. ..... 52/302.3
2001/0024941 A1 * 9/2001 Morris ..... 454/365
2002/0016150 A1 * 2/2002 Hansen ..... 454/365
2002/0028652 A1 * 3/2002 Henderson ..... 454/366
2002/0066243 A1 * 6/2002 Henderson ..... 52/199
2002/0193065 A1 * 12/2002 Morris et al. ..... 454/365
2002/0197952 A1 * 12/2002 Morris ..... 454/365
2003/0089060 A1 * 5/2003 Henderson et al. ..... 52/302.1
2004/0029523 A1 * 2/2004 Morris et al. ..... 454/365
2004/0198216 A1 * 10/2004 Morris et al. ..... 454/365
2005/0090197 A1 * 4/2005 Coulton ..... 454/365
2005/0136830 A1 * 6/2005 Morris et al. ..... 454/365
2005/0181173 A1 * 8/2005 Hermann ..... 428/119
2005/0202779 A1 9/2005 Smith
2005/0204641 A1 * 9/2005 Collister et al. ..... 52/11
2006/0105699 A1 * 5/2006 Kortuem et al. ..... 454/260
2006/0121845 A1 * 6/2006 Sells ..... 454/365
2006/0240762 A1 * 10/2006 Railkar et al. ..... 454/260
2007/0000192 A1 * 1/2007 Mantyla et al. ..... 52/199
2008/0125028 A1 * 5/2008 Morris et al. ..... 454/365
2008/0182507 A1 * 7/2008 Morris et al. ..... 454/365
2008/0216419 A1 * 9/2008 Rosten et al. ..... 52/95
2008/0220714 A1 * 9/2008 Caruso et al. ..... 454/365
2009/0025316 A1 * 1/2009 Coulton et al. ..... 52/199
2011/0201266 A1 * 8/2011 Henderson ..... 454/365
2013/0023197 A1 * 1/2013 Grisham et al. ..... 454/260
2013/0059524 A1 * 3/2013 Henderson ..... 454/365
2014/0099877 A1 * 4/2014 Gassman et al. ..... 454/366
2014/0115980 A1 * 5/2014 Edwards et al. ..... 52/173.3
2014/0260001 A1 * 9/2014 Kiik et al. ..... 52/173.3

* cited by examiner

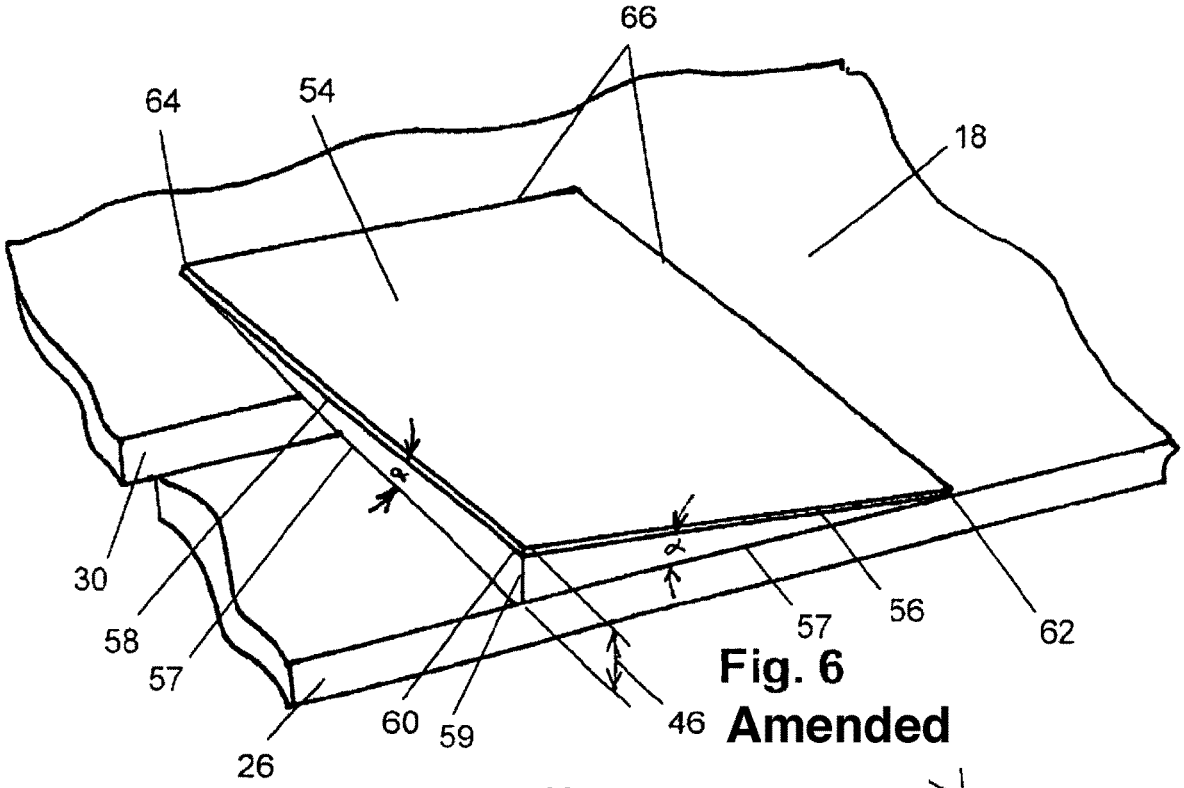
Fig. 6
Amended

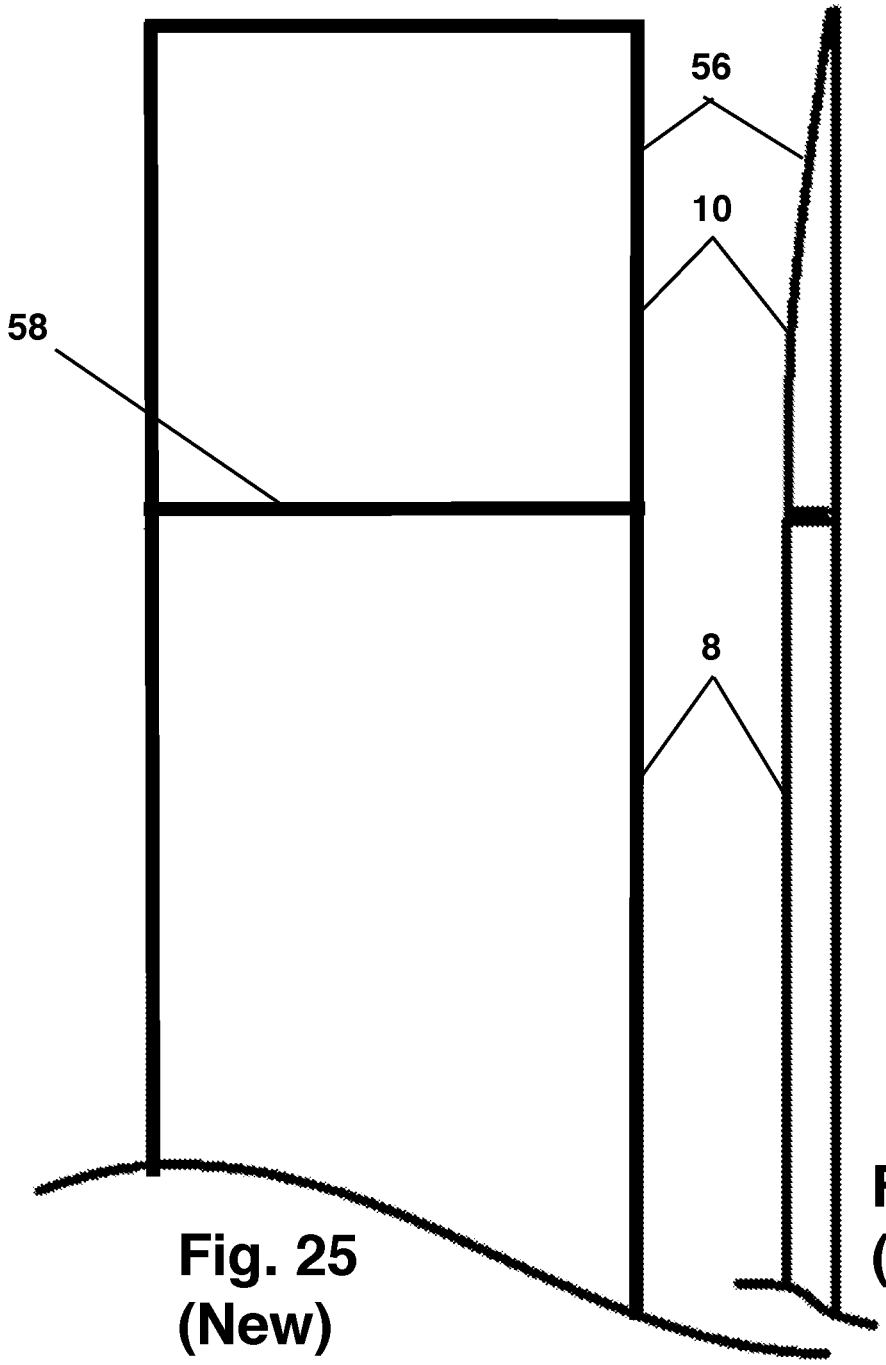
Fig. 25
(New)
Fig. 26
(New)

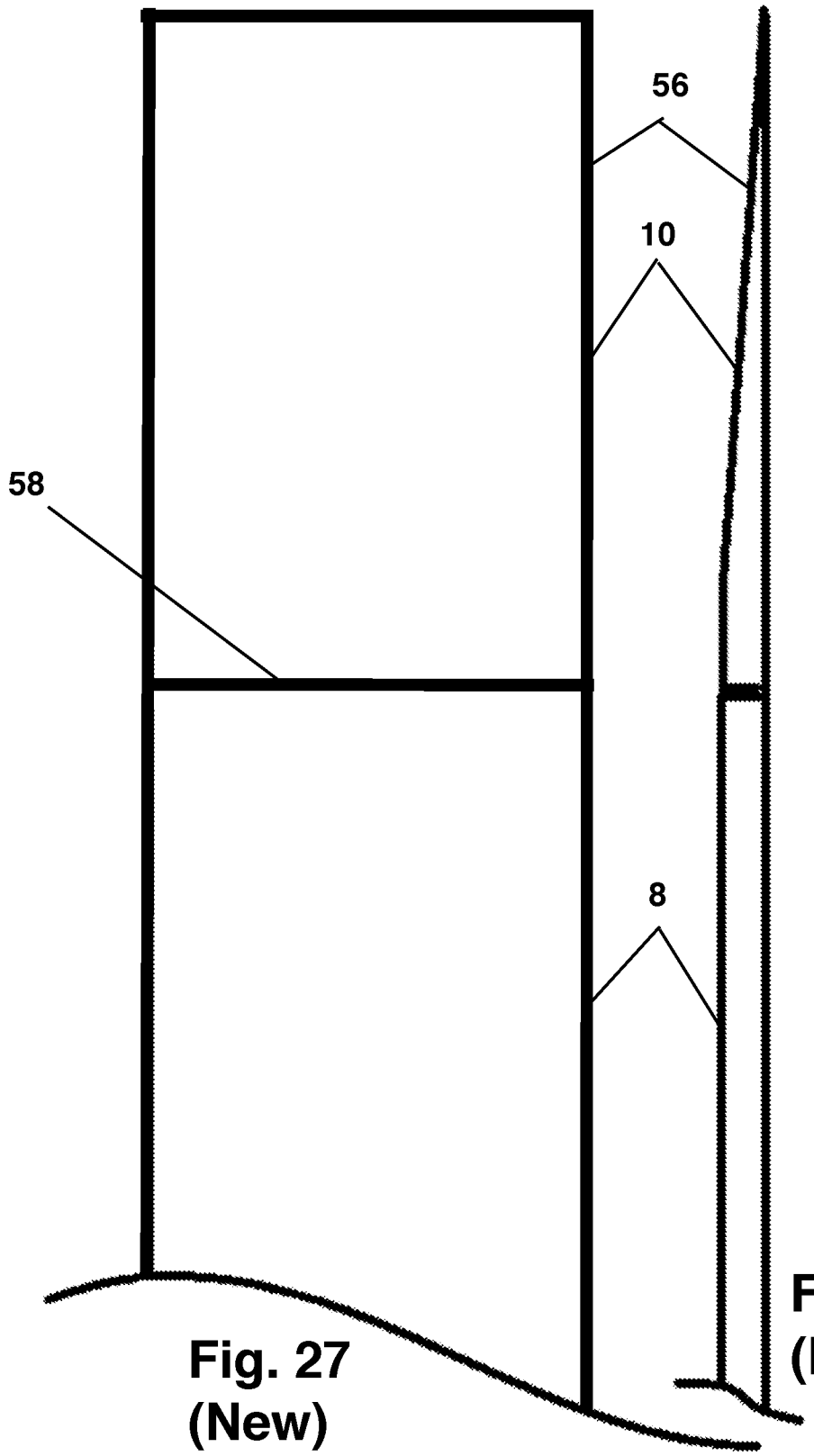
Fig. 27
(New)
Fig. 28
(New)

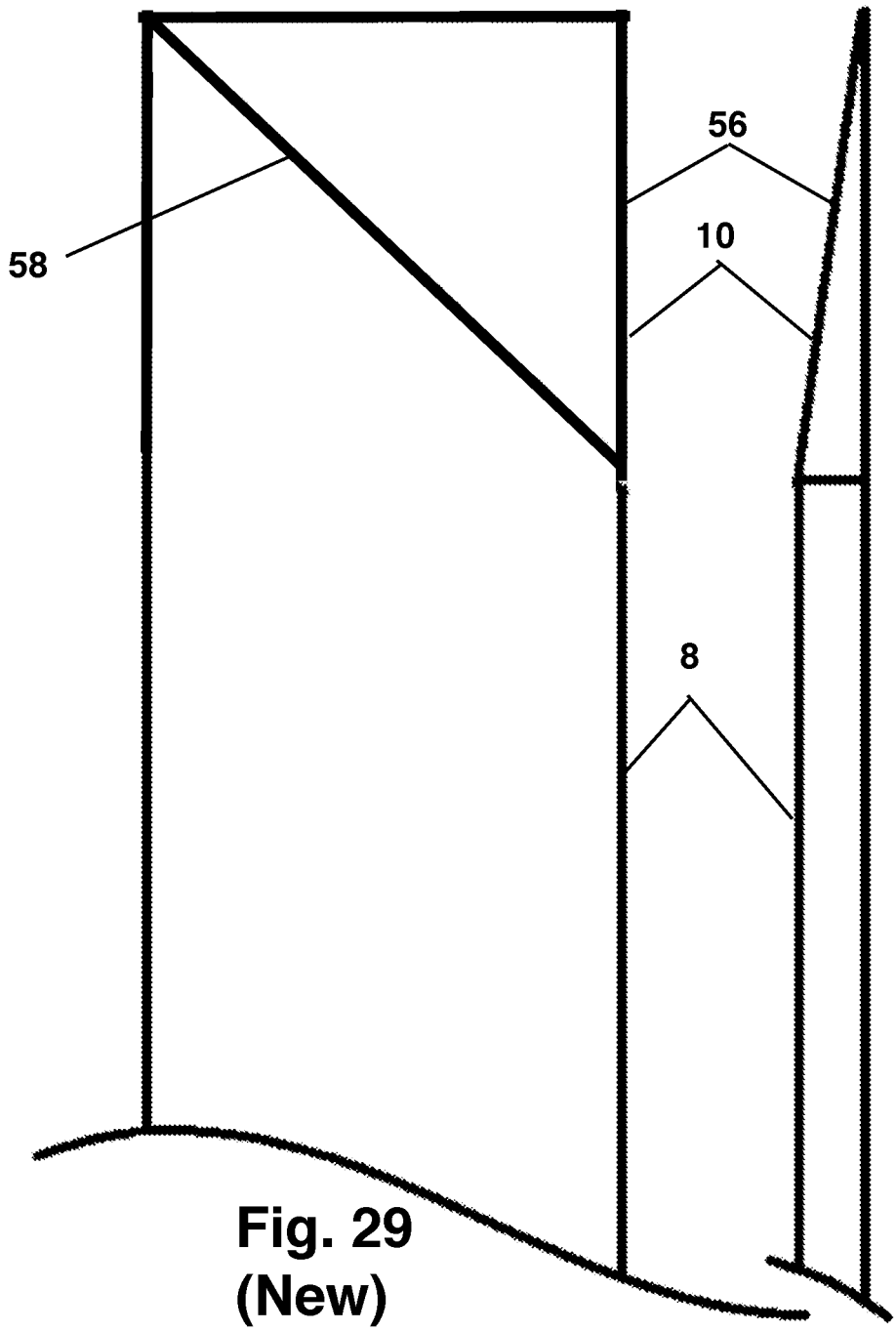
Fig. 29
(New)
Fig. 30
(New)

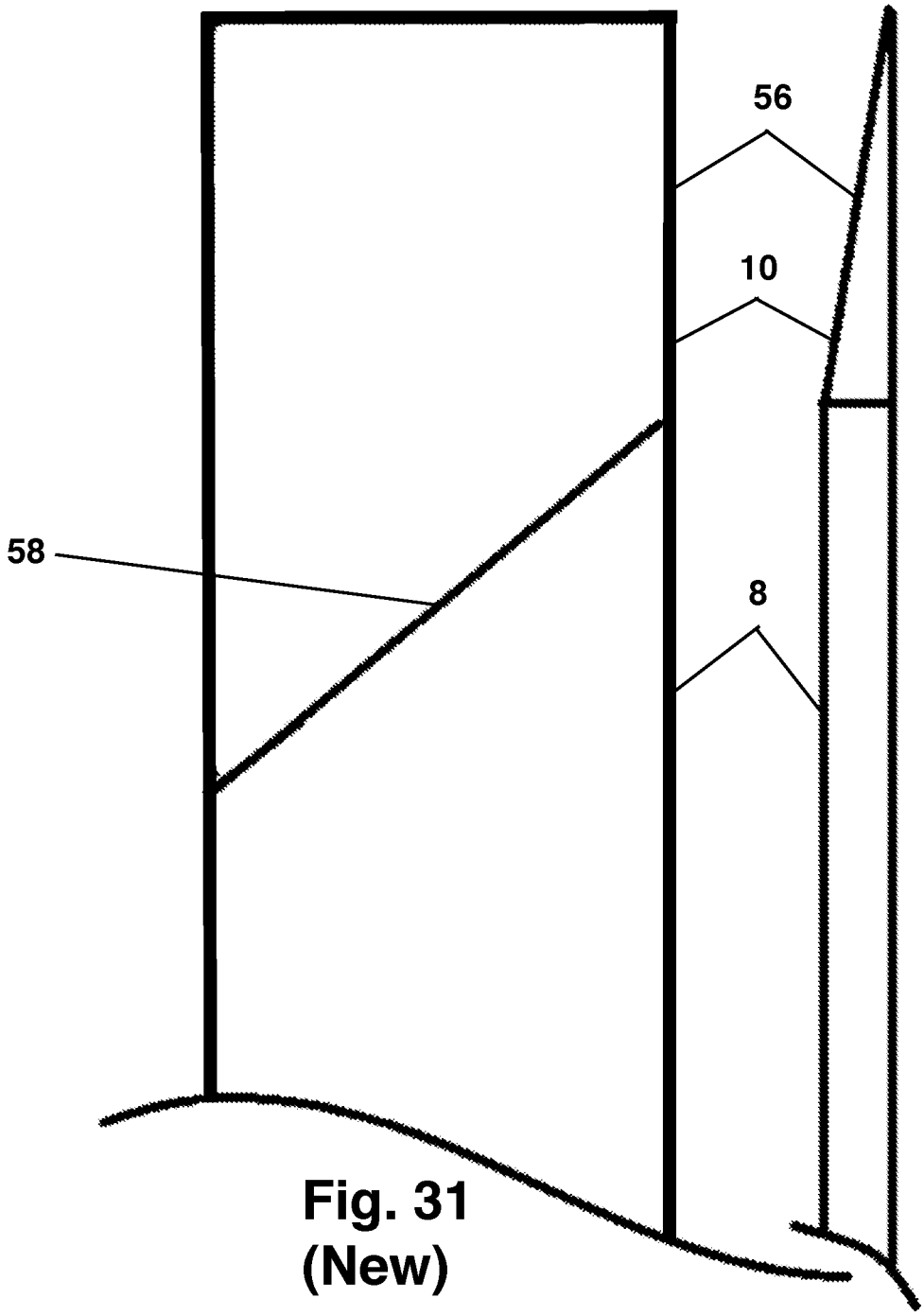
Fig. 31
(New)
Fig. 32
(New)

ROOF VENTILATION APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

I. BACKGROUND OF THE INVENTION

A. Field of the Invention

The Invention relates to the field of roof ventilation and particularly to ventilation of a roof through the upper side of the roof deck. The Invention is an above-the-deck ventilated roof featuring an end cap.

B. Description of the Related Art

The portion of a building roof that is exposed to the elements is protected by a durable, weather-resistant surface, such as shingles. As used in this document, the term 'shingle' means tab shingles, architectural shingles, cementatious shingles, metal shingles, slate, sheet metal, tar paper, roll roofing, ceramic tile roofing, wood shakes, synthetic versions of any of the above and any other weather proofing product that may be applied to a pitched roof.

The shingles are supported by a roof deck. As used in this document, a 'roof deck' means the generally planar structural covering the upper side of a building and providing support for shingles. The 'roof deck' usually is composed of wood in the form of plywood sheets or dimensioned lumber. The term 'roof deck' also may include other roofing materials previously applied to the plywood or dimensioned lumber, such as tar paper, ice and water shields, and shingles.

The roof deck has a pitch from the lower edge of the roof to the peak of the roof so that water and snow will fall from the roof. When shingles are applied to a roof deck, the shingles proximal to the lower edge of the roof are applied first and attached to the deck. Each subsequent course of shingles proceeding from the lower edge to the peak of the roof overlaps the preceding course so that water running from each shingle flows onto the top of the adjacent downhill shingle. The shingles cooperate to form a composite surface that is tight to rain water and snow melt.

Ventilation of the space under the roof is important to reduce condensation and the resulting moisture damage to the roof and to the building structure. Ventilation also serves to allow air heated by solar gain to escape from the space under the roof, reducing the cooling load on the building.

To ventilate a roof, air must both enter and leave the space under the roof. Because air under the roof is heated by solar gain and because heated air rises, the exit for air from a space under a roof usually is a vent located in a wall or a ridge vent located at the peak of the roof. Air entering the space under the roof may enter through vents installed in a soffit; that is, the underside of the portion of a roof overhanging the exterior walls of the building. Historically, the roofs of many buildings effectively were not ventilated because the buildings lacked soffits and had little or no way for air to enter the space under the roof.

An apparatus to allow air to ventilate the space under a building roof is addressed by U.S. Pat. Nos. 6,212,833 and 6,447,392 issued Apr. 10, 2001 and Sep. 10, 2002, respectively, to the inventor of the present Invention. The '833 and '392 patents address above-the-deck roof ventilation. The teachings of U.S. Pat. Nos. 6,212,833 and 6,447,392 are incorporated by reference as if set forth in full herein.

In the roof ventilation apparatus and system taught by the '392 and '833 patents, the air inlet or exhaust for a roof is an elongated vent located on the upper side of the roof deck. The elongated vent includes a vent shingle support. The vent shingle support has a width and a length that is large compared to its thickness. The vent shingle support has a downhill side and an uphill side. The downhill side of the vent shingle support is supported in a spaced-apart relation with the roof deck, the space between the roof deck and the vent shingle support at the downhill side defines the air intake. The air intake communicates through the interior volume of the elongated vent to a slot defined by the roof deck. The slot communicates with the space under the roof.

In use, air enters the air intake defined by the space between the downhill side of the vent shingle support and the roof deck. The air passes between the elongated vent shingle support and the roof deck, and passing through the slot defined by the roof deck into the space under the roof.

The uphill side of the vent shingle support is not spaced apart from the roof deck. When shingles are applied to the roof, the shingles are applied to the elongated vent shingle support and to the roof deck to the uphill side of the elongated vent shingle support so that the shingles overlap both the vent shingle support and the roof deck uphill from the vent shingle support. The shingles covering the elongated vent and the roof deck form the continuous, rain and snow melt-tight surface.

A potential issue with respect to the prior art above-the-deck roof vents occurs at either end of the elongated vent if the elongated vent is not properly installed. If the elongated vent is terminated at a location other than the gable edge of the roof deck, the shingles overlapping the end of the elongated vent are supported by the vent shingle support, but are not supported by the deck adjacent to the vent shingle support due to the spaced-apart relation between the vent shingle support and the roof deck at the downhill side of the elongated vent. The lack of support by the roof deck at the end of the incorrectly-installed elongated vent can result in failure of the shingles adjacent to the end of the elongated vent.

The prior art above-the-deck roof vent may be terminated at a valley formed by the intersection of two roof decks. Proper installation of the prior art elongated vent in this circumstance is to trim the end of the vent to conform to the valley, which fully supports shingles overlapping the end of the elongated vent. If the elongated vent is not trimmed in this circumstance, the shingles overlapping the end of the elongated vent are not supported and may fail.

The potential failure of an improperly installed roof vent adjacent to the end of the vent is a characteristic of all current above-the-deck roof ventilation systems.

II. BRIEF DESCRIPTION OF THE INVENTION

The Invention is an end cap for an above-the-deck roof ventilation system. The Invention also is a roof that includes the end cap. The end cap of the Invention features an end cap shingle supporting surface. The end cap is configured to be located at the end of a prior art elongated vent. The end cap of the Invention is configured to provide support to shingles overlapping the end of the elongated vent and to prevent failure of the overlapping shingles. Using the end cap, the elongated vent may be installed anywhere on the roof deck and need not extend to the gable edge of the deck or to a valley caused by intersection of two roof decks.

While the end cap may be used in conjunction with an elongated vent at the roof edge, the elongated vent and end cap also may be used proximal to the peak of the roof deck to exhaust air from the area under the roof. The end cap and elongated vent also may be placed in at any location on the roof deck at which ventilation is desired intermediate between the roof edge and the peak of the roof.

The end cap has an end cap shingle supporting surface. The end cap shingle supporting surface has a length. The end cap shingle supporting surface has a first edge, a second edge and a first corner. The first corner is defined by an intersection of the first and second edges. The end cap shingle supporting surface at the first corner is supported in a spaced-apart relation to the roof deck. The spaced apart relation between the end cap shingle supporting surface at the first corner and the roof deck is equivalent, as defined below, to the spaced apart relation between the downhill side of the vent shingle supporting surface and the roof deck.

The end cap is configured so that when the first edge is installed adjacent to the end of the elongated vent with the first corner adjacent to the downhill side of the elongated vent, the separation between the top surface of the roof deck and the first edge is equivalent to the separation between the top surface of the roof deck and the vent shingle supporting surface immediately adjacent to the first edge at each location along the length of the first edge.

The end cap is further configured so that when the second edge is installed adjacent to the other end of the elongated vent with the first corner adjacent to the downhill side of the elongated vent, the separation between the roof deck and the second edge is equivalent to the separation between the top surface of the roof deck and the vent shingle supporting surface immediately adjacent to the second edge at each location along the length of the second edge.

As used in this document, the term "equivalent" means that the difference in elevation above the top surface of the roof deck of the vent shingle supporting surface and the immediately adjacent end cap shingle supporting surface is adequately small that a shingle spanning both the vent shingle support and the end cap shingle support is not subject to stresses due to the difference in elevation that would cause failure of the shingle in ordinary and expected use. Although the acceptable difference in elevation above the roof deck will vary with the strength of the shingle used to span the different elevations, the applicant believes that a difference in elevation of 3/16 inches is acceptable in practice.

Each of the first and second edges has a length. The length of the first or second edge of the end cap adjacent to the end of the elongated vent is selected to correspond to the width of the vent shingle supporting surface. The end cap may be reversible and may be used at either end of the elongated vent, in which event the lengths of the first and second edge are equal one to the other and both are equal to the width of the elongated vent. Each of the first and second edges of the end cap shingle supporting surface has an end opposite to the first corner. The ends of the first and second edges opposite to the first corner are in a 'close relation,' as defined below, to the roof deck. The remainder of the periphery of the end cap shingle supporting surface that is not defined by the first and second edges (the 'other edge' or 'other edges') also is in a close relation to the roof deck. As used in this document, the term 'close relation' means that the difference in elevation between the top surface of the roof deck and the end cap shingle supporting surface at the ends of the first and second edges opposite to the first corner and at the 'other edge' is adequately small that a shingle may overlap the end cap and roof deck without risk of failure of the shingle due to the difference in elevation in ordinary and expected use. As stated above, a difference in elevation of 3/16 inches has proven suitable in practice.

An end cap may be joined to another end cap or to an elongated vent for manufacture, transportation, sale or installation. For example, two end caps may be manufactured as a unit. During installation, the end user cuts the two end caps apart and installs the end caps at either or both ends of an elongated vent on a roof deck. As a second example, one or two end caps may be manufactured as a unit along with an elongated vent. The end user can install the elongated vent and integral end cap or caps on the roof deck. Alternatively, the end user can cut one or both of the end caps from the elongated vent for installation on the roof deck.

The end cap may include an end cap air vent, the inlet to the air vent being defined by the spaced-apart relation between the first or second edges and the top surface of the roof deck; alternatively, the end cap may not include air vents. The air vents may communicate with the slot defined by the top surface of the roof deck.

The end cap may or may not include an end cap air vent and may or may not communicate with the opening communicating through the roof deck. Any construction of the end cap that supports the end cap shingle supporting surface at a suitable elevation above the roof deck at the first corner and that does not support the 'other edge or other edges' in a spaced apart relation to the roof deck is contemplated by the invention. For example, the end cap may be a solid piece of a plastic, foam, metal or wood and not allow communication with the opening communicating through the roof deck. As a second example, the end cap may be a hollow injection-molded plastic part that does not allow communication with the opening in the roof deck. As a third example, the end cap may be a hollow plastic part that defines an end cap air intake opening and that does communicate through the interior volume of the end cap to the opening in the roof deck. The end cap may be composed of any suitable material.

The end cap may be composed of a plastic and may comprise the end cap shingle supporting surface, a first corner support supporting the first corner and secondary supports intermediate between the first corner support and the ends of the first and second edges opposite to the first corner. The intermediate supports may define channels from the air inlet to the slot defined by the roof deck when the end cap is installed on a roof.

The end cap may be injection molded as a lower portion and an upper portion, the lower portion being configured to engage the roof deck, the upper portion defining the end cap shingle supporting surface. The injection molded upper and lower portions maintain the shape of the end cap and conform the first and second edges to the shape of the end of the elongated vent.

III. BRIEF DESCRIPTION OF THE DRAWINGS

FIG. 6 is a detail perspective view of the end cap on the roof deck.

*FIGS. 25 and 26 are two views of an embodiment.*

*FIGS. 27 and 28 are two views of an embodiment.*

*FIGS. 29 and 30 are two views of an embodiment.*

*FIGS. 31 and 32 are two views of an embodiment.*

IV. DESCRIPTION OF AN EMBODIMENT

Figure 1:
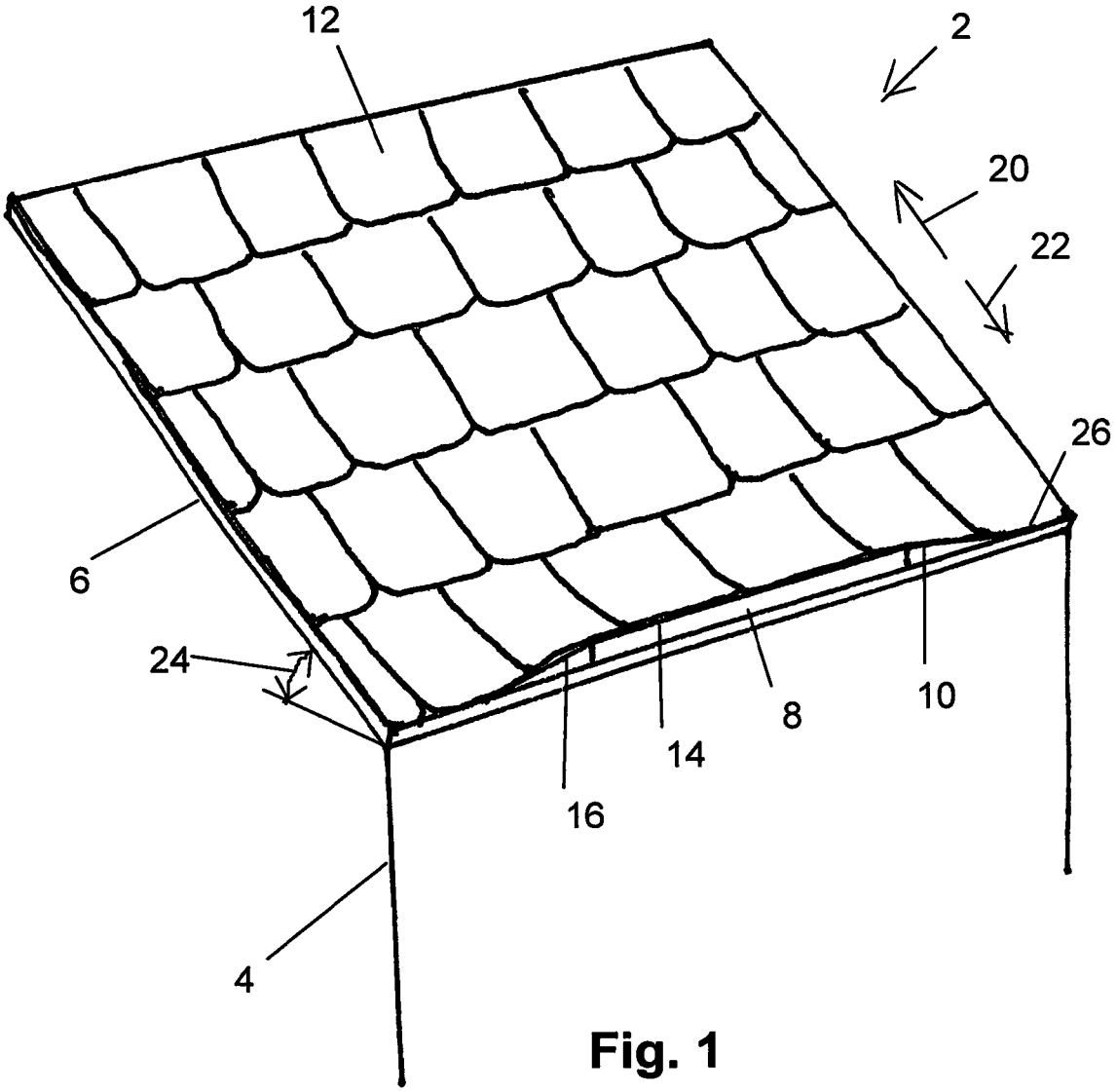
FIG. 1 is a perspective view of the ventilated roof of the invention.

From FIG. 1, a ventilated roof 2 of a building 4 includes a roof deck 6, an elongated vent 8 and at least one end cap 10. Overlapping shingles 12 cover the roof deck and the elongated vent 8 and the end cap 10. The elongated vent 8 defines a vent air intake opening 14. End cap 10 may define an end cap air intake 16; alternatively, end cap may not define an end cap air intake 16.

The structure of the ventilated roof apparatus 2 of FIG. 1 is illustrated by FIGS. 2 through 8. From FIG. 3, the roof deck 6 has a top surface 18. Top surface 18 has a pitch 24 and defines an uphill direction 20 and a downhill direction 22. The roof deck 6 defines a roof edge 26 in the downhill direction 22. An opening 28 is defined by the top surface 18 of roof deck 6. Opening 28 communicates through the roof deck 6 to a space to be ventilated, such as an attic. As noted above, opening 28 in roof deck 6 is not required to be proximal to roof edge 26 and may be in any location on the roof deck 6 from the roof edge 26 to the peak.

Opening 28 may be of any shape and an elongated slot 30 has proven suitable in practice. Other configurations for opening 28 are discussed below in relation to FIG. 23.

Figure 4:
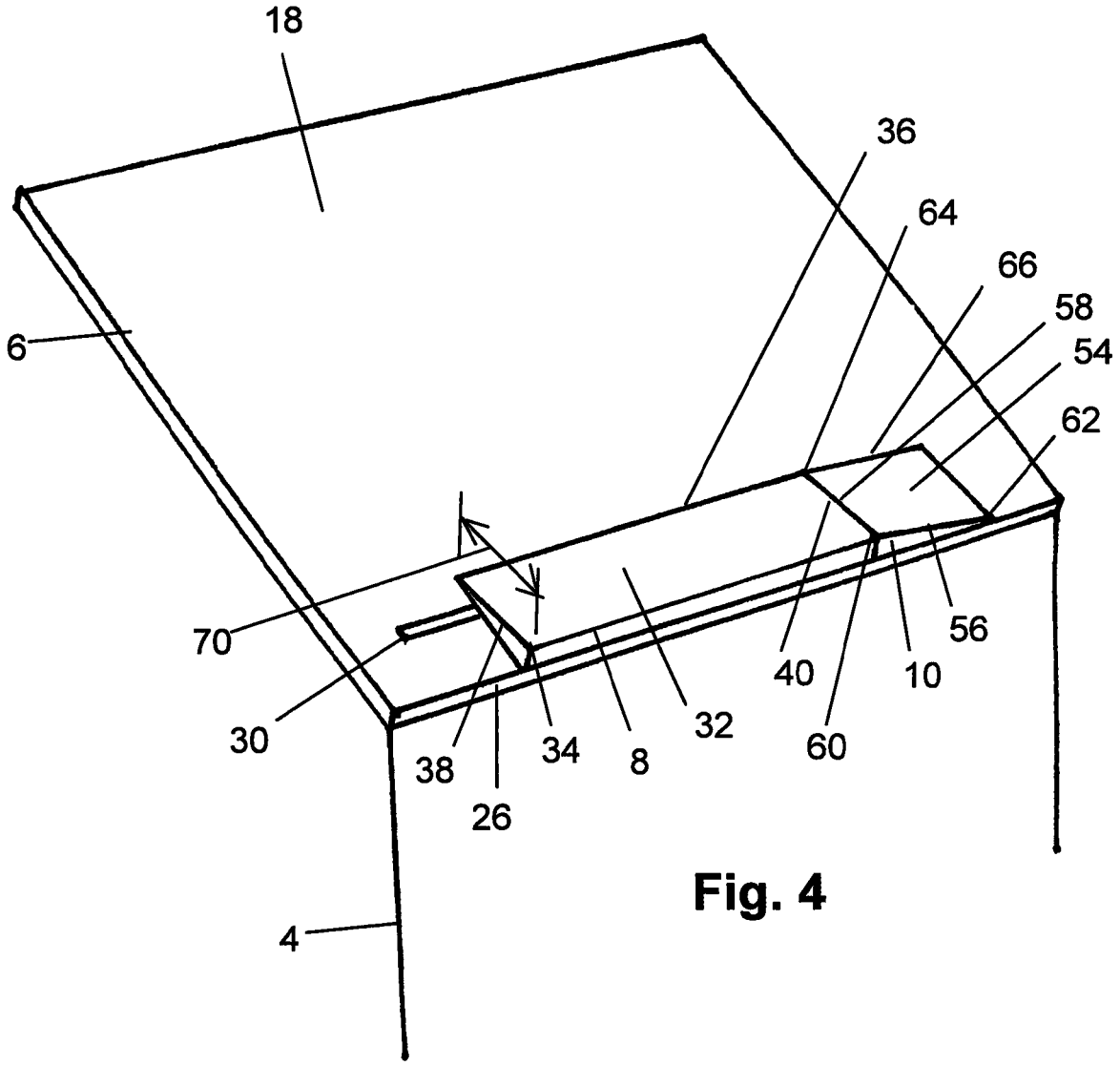
FIG. 4 is a perspective view of the roof deck with an elongated roof vent and end cap in place.

From FIG. 4, elongated vent 8 has an elongated vent shingle-supporting surface 32. Elongated vent 8 also has a downhill side 34, an uphill side 36, a first end 38 and a second end 40. Elongated vent 8 is attached to roof deck 6 so that elongated vent 8 is located over opening 28. Opening 28 and hence elongated vent 8 and end cap 10 are oriented to be horizontal to improve runoff of rainwater and snow melt and to prevent water from entering elongated vent air intake opening 14.

Figure 2:
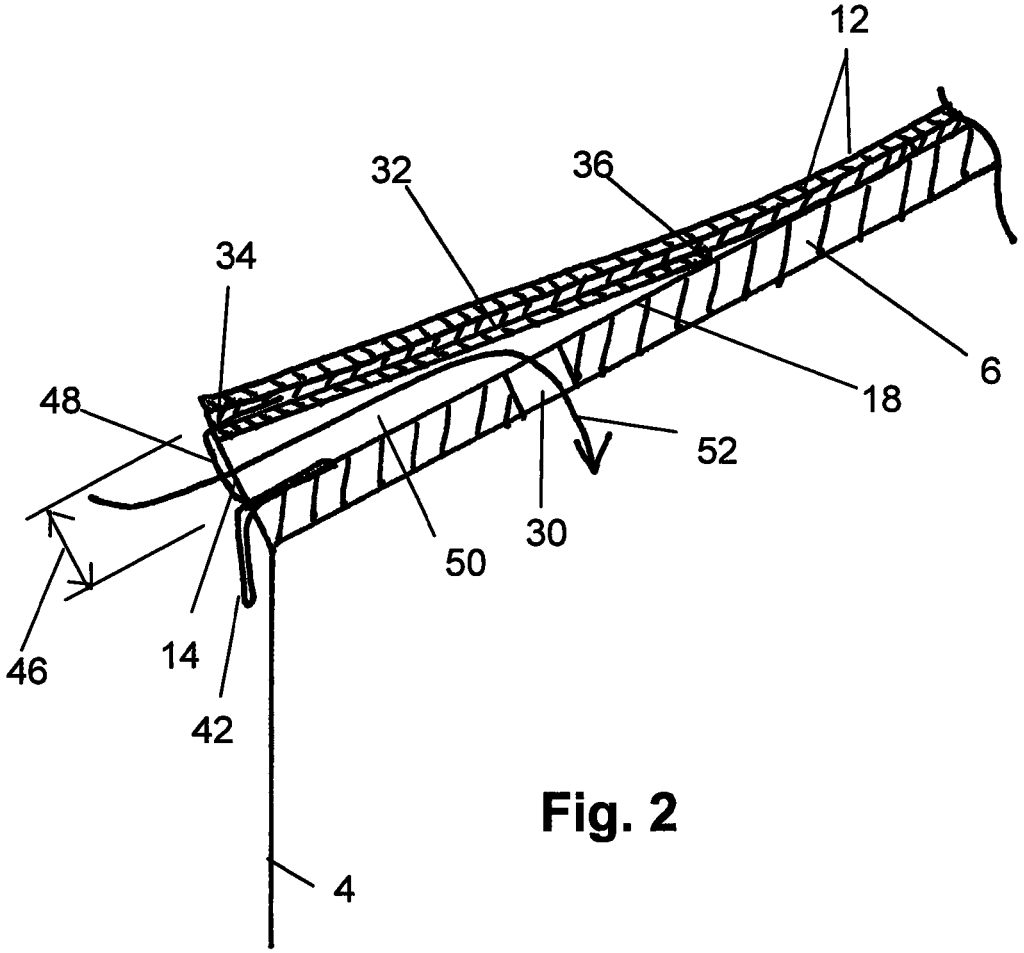
FIG. 2 is a detail cross section showing the flow of air.
Figure 3:
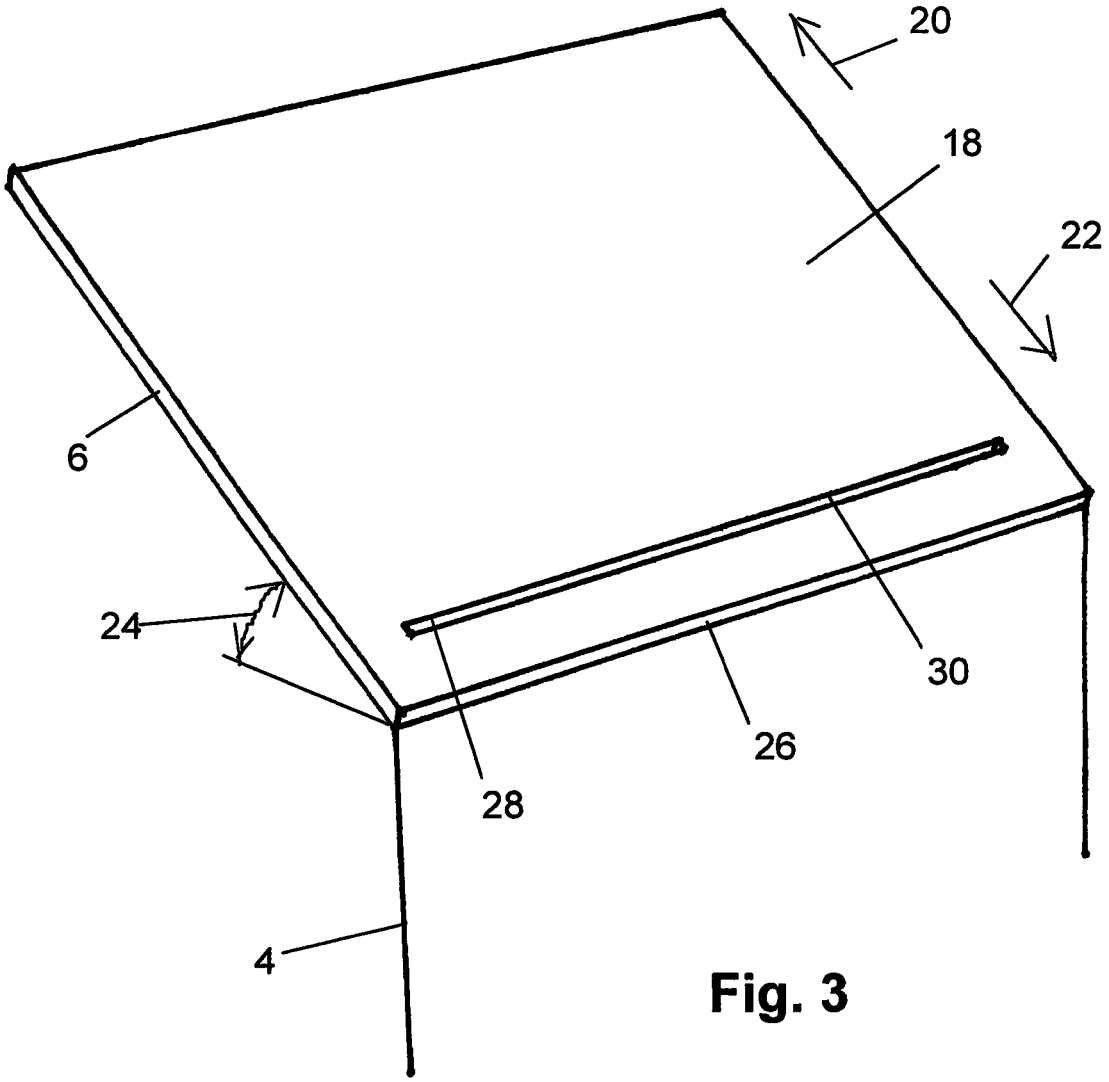
FIG. 3 is a perspective view of a roof deck and opening.

The structure and operation of the elongated vent 8 is illustrated by FIG. 2. The downhill side 34 of the elongated vent shingle-supporting surface 32 is disposed in a spaced-apart relation 46 to the top surface 18 of the roof deck 6. A distance of approximately 0.75 inches has proven suitable in practice for the spaced-apart relation 46 between the downhill side 34 of the elongated vent shingle-supporting surface 32 and the top surface 18 of roof deck 6. The spaced-apart relation 46 between the elongated vent shingle-supporting surface 32 and the top surface 18 of the roof deck 6 at the downhill side 34 of the elongated vent 8 defines the elongated vent air intake opening 14. Fabric 48 prevents entry of insects or debris into the vent opening 14.

The separation between the top surface 18 of the roof deck 6 and the elongated vent shingle-supporting surface 32 defines an elongated vent interior volume 50. The elongated vent air intake opening 14 is in fluid communication with interior volume 50 and interior volume 50 is in fluid communication with slot 30.

The elongated vent shingle-supporting surface 32 at the uphill side 36 of the elongated vent 8 is in a close relation with the top surface 18 of roof deck 6. The phrase "close relation" in this context means that the elongated vent shingle-supporting surface 32 at the uphill side 36 of the elongated vent 8 is adequately close in elevation to the top surface 18 of the roof deck 6 at the location where the elongated vent shingle-supporting surface 32 meets the top surface 18 of the roof deck 6 that a shingle may span that difference in elevation without damage to the shingle during ordinary use due to the difference in elevation. A difference in elevation of 3/16 of an inch has proven suitable in practice.

Drip edge 42 is attached to the top surface 18 of roof deck 6 at the roof edge 26. Drip edge 42 directs water down the side of building 4 and away from roof deck 6.

In operation, ventilation air 52 passes through the fabric 48 and enters the vent air intake opening 14. The ventilation air 52 passes through interior volume 50 of the elongated vent 8 and through slot 30 into the space to be ventilated.

The structure and operation of the end cap are illustrated by FIGS. 4 through 8. From FIGS. 6 through 8, the end cap 10 has an end cap shingle-supporting surface 54. The end cap shingle-supporting surface 54 defines a first edge 56 and a second edge 58. The intersection of the first and second edges 56, 58 defines a first corner 60. First corner 60 is supported in a spaced apart relation 46 to the top surface 18 of roof deck 6. The spaced apart relation 46 of the first corner 60 to the top surface 18 is equivalent to the spaced apart relation of the elongated vent shingle-supporting surface 32 to the top surface 18 of the roof deck 6 at the downhill side 34, shown by FIG. 2. An included angle $\alpha$ is defined by the first or the second edge 56, 58 and a line parallel to the roof deck. The first edge 56, second edge 58 or end cap shingle supporting surface 54 defines a right triangle having a first leg 57 parallel to the roof deck 6 and a second leg 59 normal to the roof deck 6.

Each of the first and second edges 56, 58 has an end 62, 64 opposite to the first corner 60. Ends 62 and 64 are in a 'close relation,' as that phrase is defined above, to the top surface 18 of roof deck 6.

In use and as shown by FIG. 4, the first edge 56 of the end cap 10 is located adjacent to the second end 40 of the elongated vent 8. The end cap shingle supporting surface 54 at the first corner 60 and the adjacent elongated vent shingle supporting surface 32 at the downhill side 34 are in the equivalent spaced-apart relation 46 to the top surface 18 of roof deck 6. The uphill side 36 of the elongated vent shingle supporting surface 32 and the end 64 of the second edge 58 of the end cap shingle supporting surface 54 are both in the same "close relation," as defined above, to the top surface 18 of the roof deck 6. The elongated vent shingle supporting surface 32 and the end cap single supporting surface thereby provide continuous support to a shingle 12 that spans the second end 40 of the elongated vent 8 and the second edge 58 of the end cap 10.

The end 62 of the end cap first edge 56 is in a 'close relation,' as defined above, with the top surface 18 of the roof deck 6. The end cap shingle supporting surface 54 and the top surface 18 of the roof deck 6 thereby provide substantially continuous support to a shingle 12 that spans the end 62 of the first edge 56 opposite to the first corner 60 and the top surface 18 of the roof deck 6. The other edges 66 of the end cap 10 that are not the first and second edges 56, 58 also are in a "close relation," as defined above, to the top surface 18 of roof deck 6, and hence provide substantially continuous support to a shingle 12 spanning the top surface 18 of roof deck 6 and the other edges 66 of end cap 10.

Figure 5:
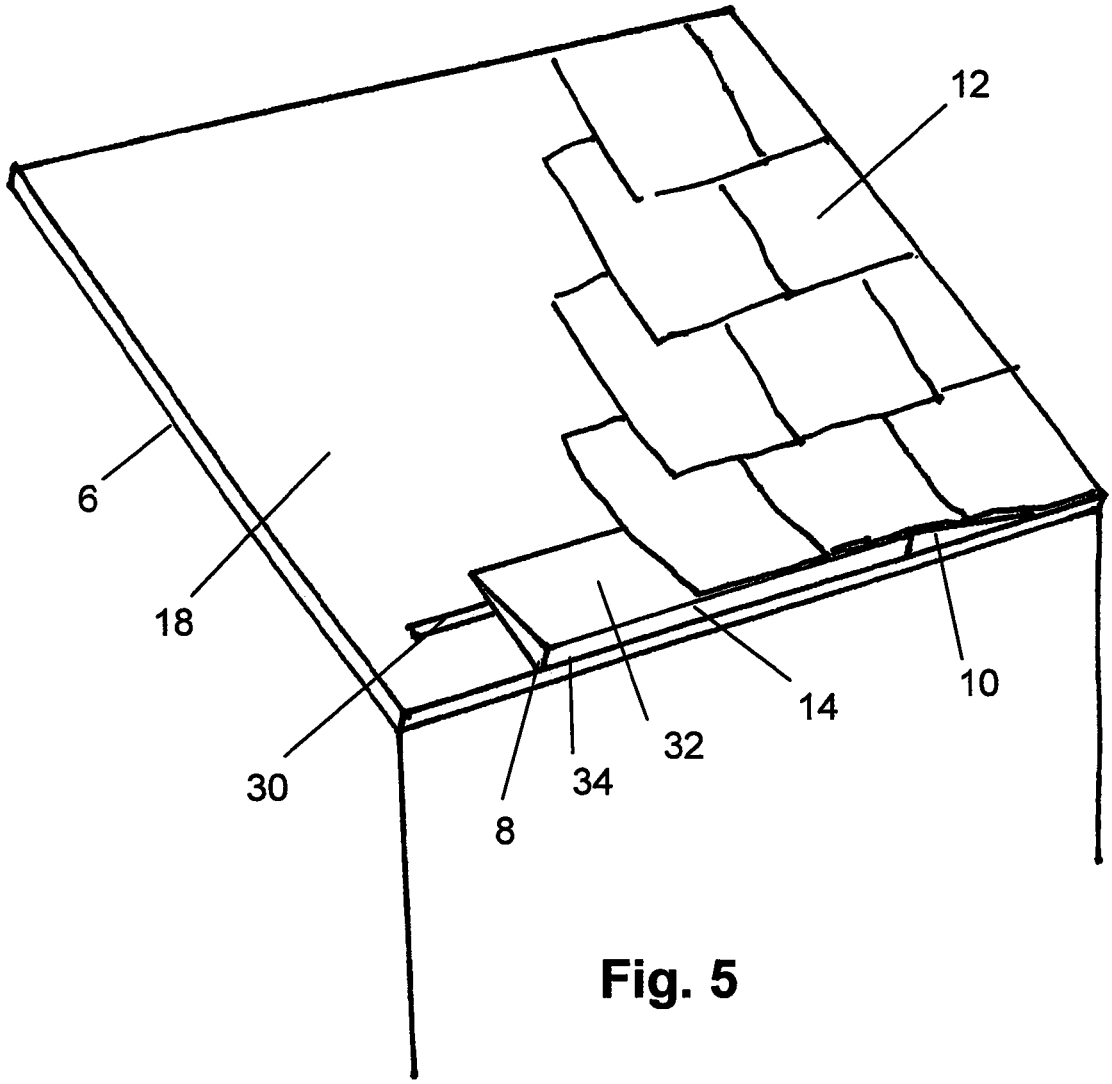
FIG. 5 is a perspective view of the roof deck of FIG. 4 partially shingled.

FIG. 5 shows the installation of shingles 12 over the top surface 18 of the roof deck 6, the end cap 10 and the elongated vent 8. The shingles 12 are supported by the end cap shingle supporting surface 54 and the elongated vent shingle supporting surface 32. The support for the shingles 12 is substantially continuous where the shingles 12 span the top surface 18 of the roof deck 6, the end cap shingle supporting surface 54 and the elongated vent shingle supporting surface 32. The shingles 12 therefore do not suffer premature failure due to insufficient and discontinuous support of the shingles 12. Using the end cap 10, the elongated vent 8 may be installed at any location along the roof edge 26. Without the end cap 10, the elongated vent 8 must either terminate at the side edge of the roof or must be trimmed to terminate at a valley defined by the intersection of two pitched roof decks 6. The end cap 10 therefore simplifies and makes more reliable installation of the elongated vent 8.

End cap 10 is reversible and may be located at either the first end 38 or second end 40 of the elongated vent 8. The above description applies when the end cap 10 is located at the second end 40 of the elongated vent 8. To locate the end cap 10 at the first end 38 of the elongated vent 8, the end cap 10 is rotated counterclockwise by 90 degrees and the first edge 56 of the end cap 10 is located adjacent to the first end 38 of elongated vent 8. The first corner 60 of the end cap shingle supporting surface 54 therefore is located adjacent to the downhill side 34 of the first end 38 of the elongated vent 8. The first corner 60 and the elongated vent shingle supporting surface 32 at the downhill side 34 of the elongated vent 8 are in equivalent (as defined above) spaced-apart relations 46 to the top surface 18 of roof deck 6. The ends 62, 64 of the first and second edges 56, 58 opposite to the first corner 60 of the end cap shingle-supporting surface 54 are in a "close relation," as defined above, to the top surface 18 of the roof deck 6. The other edges 66 of the end cap 10 also are in a "close relation" to the top surface 18 of the roof deck 6. The first edge 56 of the end cap shingle supporting surface 54 and the elongated vent shingle supporting surface 32 at the first end 40 of the elongated vent 8 in combination define a substantially continuous support for shingles 12.

Figure 7:
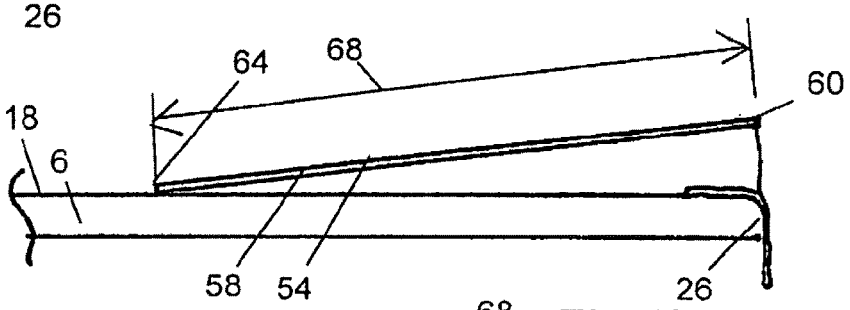
FIG. 7 is a side view of the end cap of FIG. 6 on the roof deck.
Figure 8:
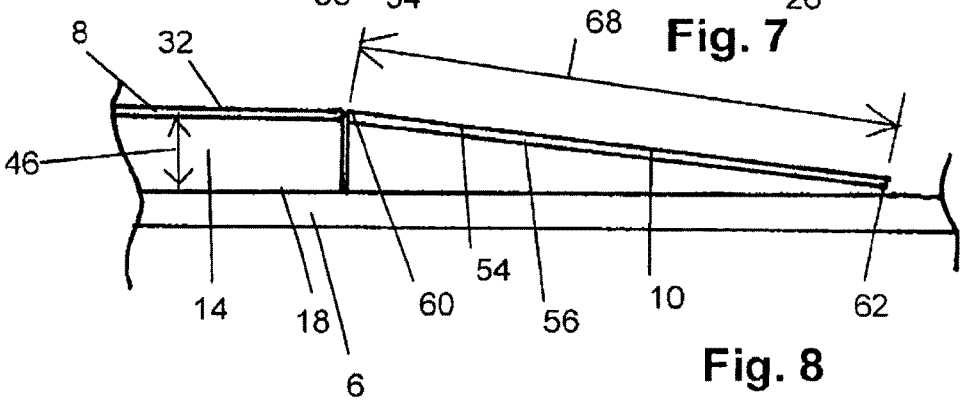
FIG. 8 is a view of the downhill side of the end cap, elongated roof vent and roof deck.
Figure 9:
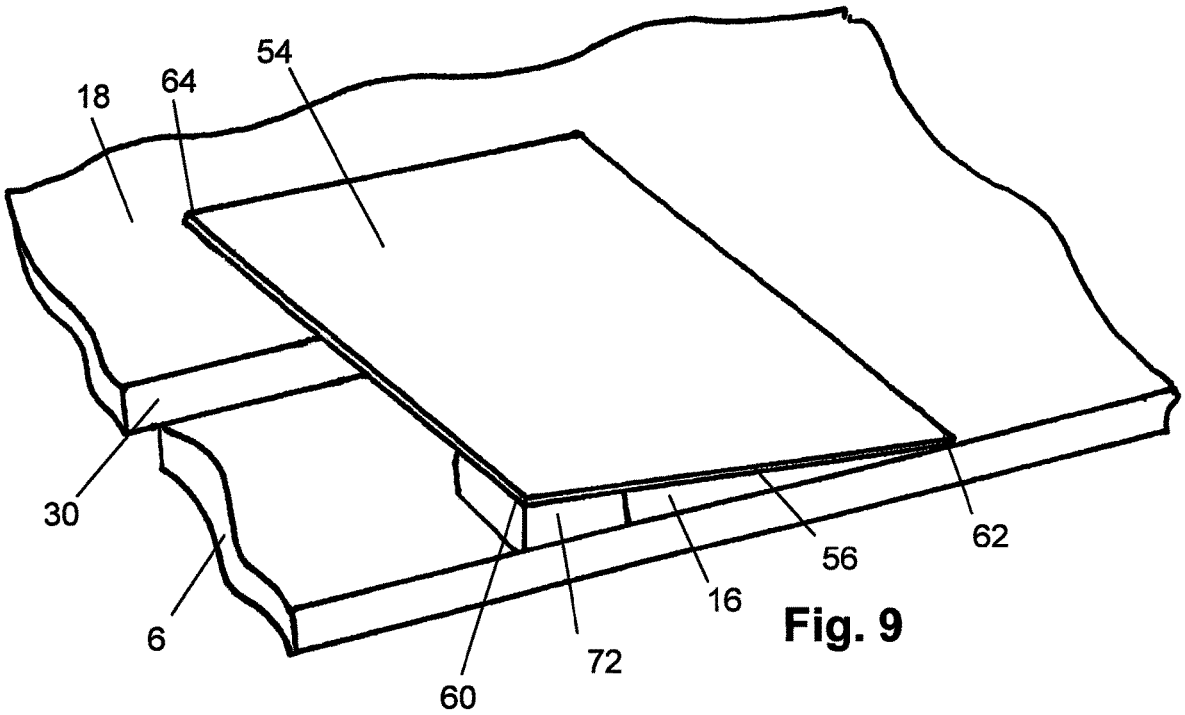
FIG. 9 is a perspective view of one embodiment of the end cap.
Figure 10:
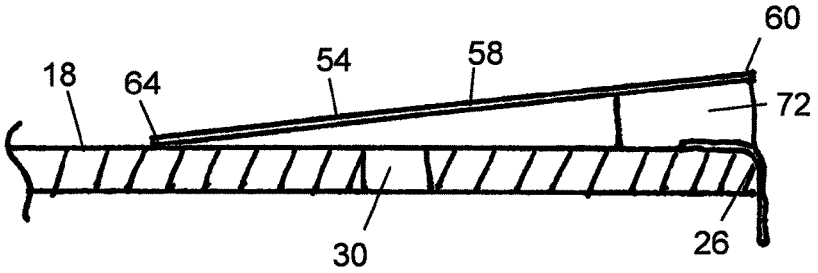
FIG. 10 is a side view of the embodiment of FIG. 9 with a section through the roof deck.

The end cap 10 is reversible and may be used at either end 38, 40 of elongated vent because the first and second edges 56, 58 of the end cap 10 are substantially equal in length 68 (from FIGS. 7 and 8). Lengths 68 are substantially equal to the width 70 of the elongated vent shingle supporting surface 32 (from FIG. 4). End cap 10 also is reversible because the spaced-apart relation 46 between the first and second edges 56, 58 at each location along their length 68 and the top surface 18 of the roof deck 6 is equivalent, as defined above, to the spaced apart relation 46 of the corresponding elongated vent shingle supporting surface 32 adjacent to the first or second edges 56, 58.

The end cap 10 may be one of a pair of end caps 10, with each end cap 10 of the pair located at one of the first end 38 or the second end 40 of the elongated vent 8.

Figure 11:
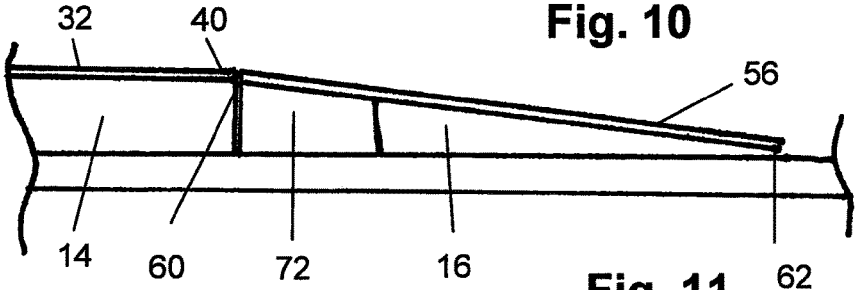
FIG. 11 is a view of the downhill side of the elongated roof vent, end cap and roof deck of the embodiment of FIG. 9.
Figure 12:
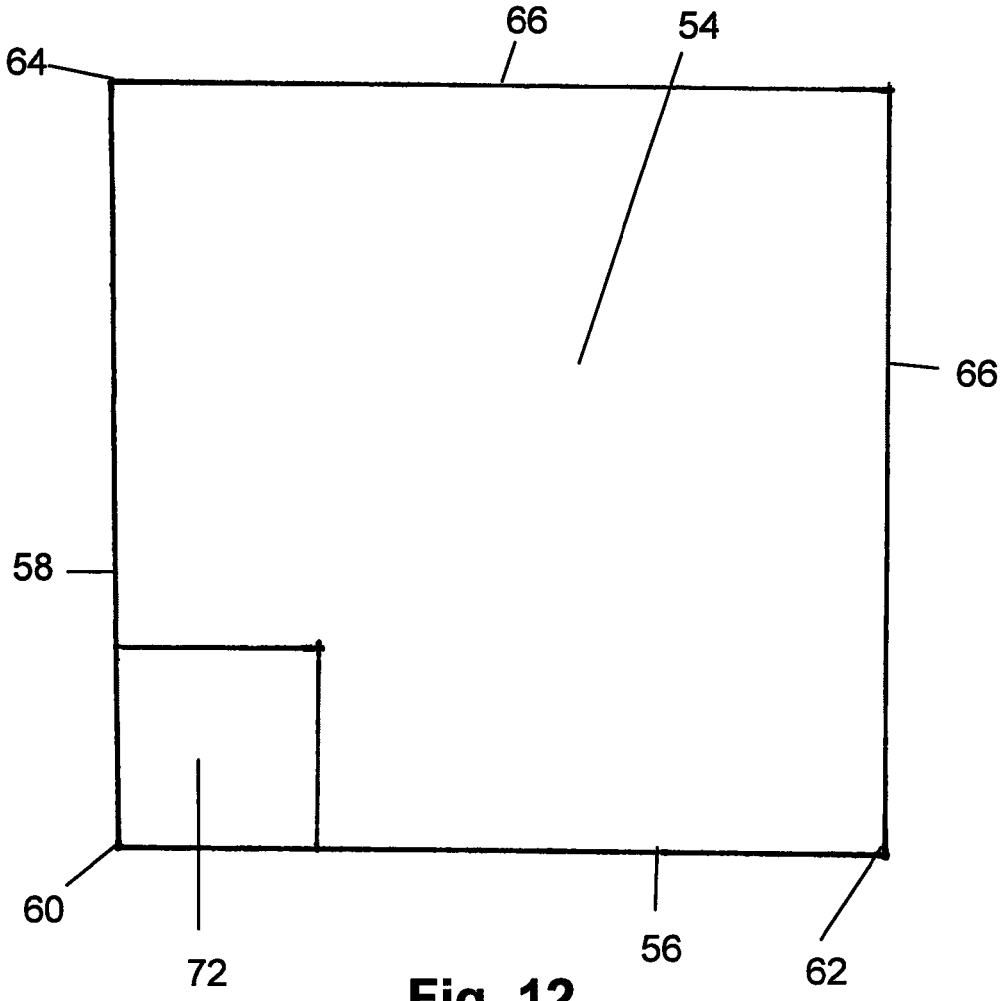
FIG. 12 is a bottom view of the end cap of FIG. 9.
Figure 13:
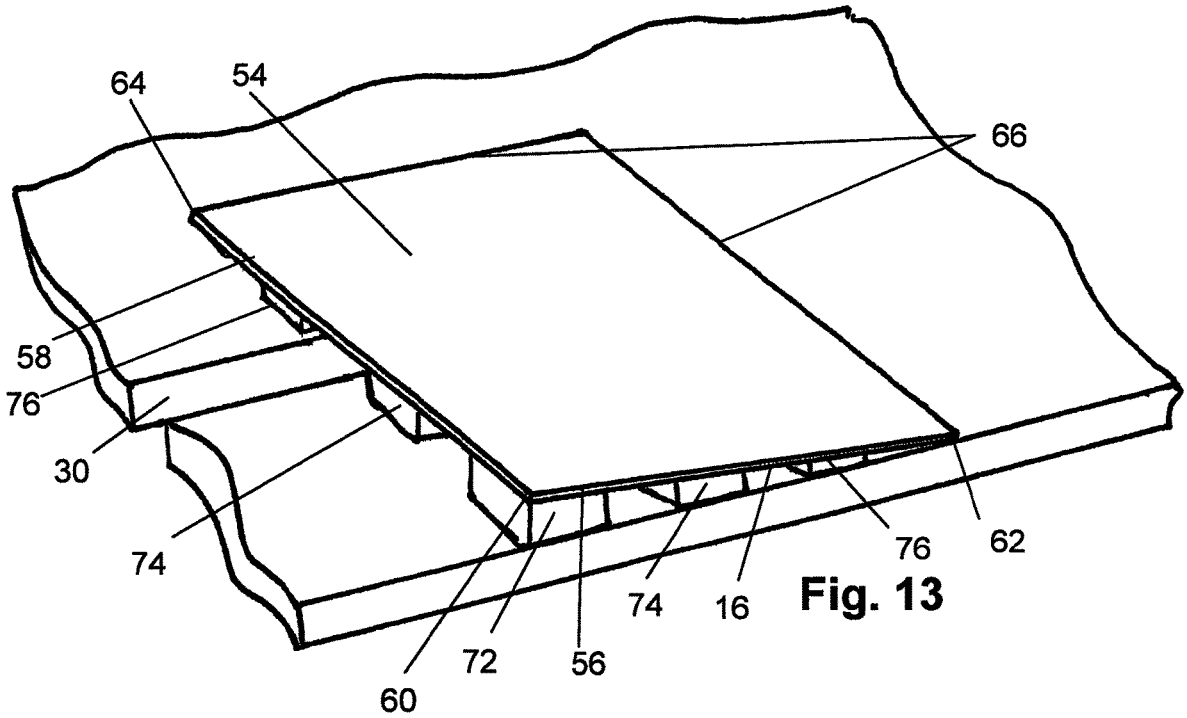
FIG. 13 is a perspective view of a second embodiment of the end cap.
Figure 14:
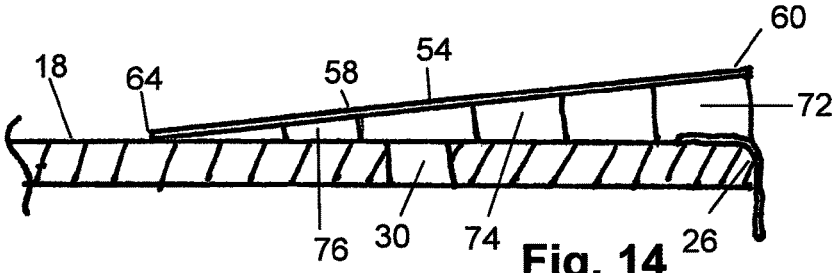
FIG. 14 is a side view of the end cap of FIG. 13, including a section through the roof deck.
Figure 15:
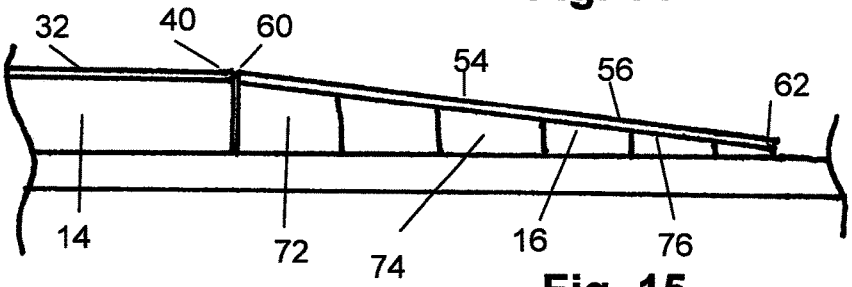
FIG. 15 is a view of the downhill side of the elongated roof vent and end cap of FIG. 13.

FIGS. 9-12 illustrate an embodiment of the end cap 10 in which the end cap provides an end cap air intake 16. First corner support 72 supports the first corner 60 in the spaced apart relation 46 from the top surface 18 of roof deck 6. When the second edge 58 of end cap shingle supporting surface 54 is located adjacent to the second end 40 of the elongated end cap 8, as illustrated by FIG. 11, the spaced apart relation 46 between first edge 56 and top surface 18 of roof deck 6 defines the end cap air intake 16. End cap air intake 16 is in fluid communication with slot 30, allowing air to enter end cap air intake 16 and hence to enter slot 30. FIG. 12 is a plan view of the underside of the end cap 10 illustrated by FIGS. 9-12.

FIGS. 13-16 illustrate another embodiment of the end cap in which the end cap 10 provides an air intake 16. First corner support 72 supports first corner 60 in the spaced apart relation 46 to the top surface 18 of roof deck 6. First intermediate support 74 and second intermediate support 76 support first edge 56 and second edge 58 above top surface 18 of roof deck 6 such that the spaced-apart relation 46 tapers smoothly until end cap shingle supporting surface 54 is in a "close relation," as defined above, to the top surface 18 of the roof deck 6 at ends 62, 64, and at the other edges 66. End cap air intake 16 is in fluid communication with the slot 30.

Figure 16:
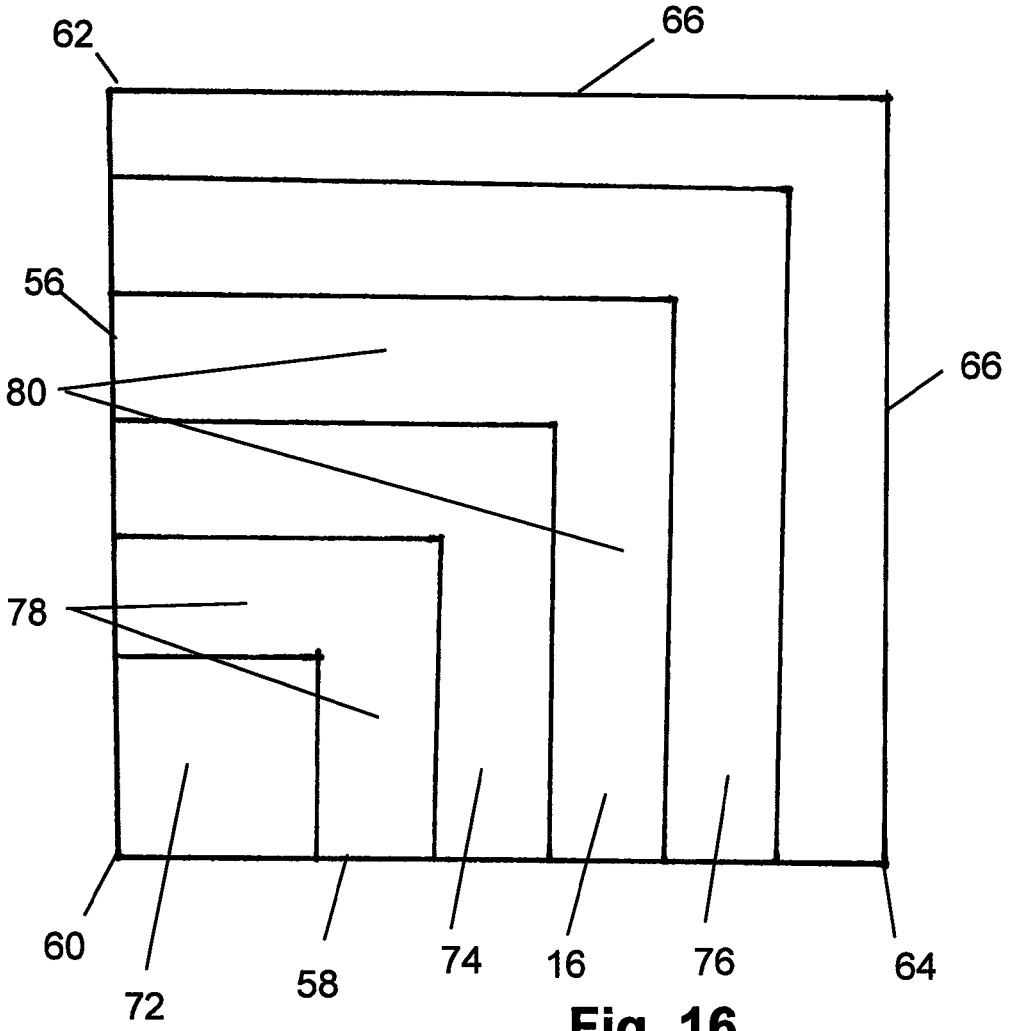
FIG. 16 is a plan view of the underside of the end cap of FIG. 13.

FIG. 16 is a plan view of the underside of the end cap 10 of the embodiment of FIGS. 13-16. As shown by FIG. 16, the first and second intermediate supports 74, 76 are bilaterally symmetrical, allowing the end cap 10 to be utilized at either the first end 38 or the second end 40 of the elongated vent 8. The first intermediate support 74 in cooperation with the first corner support 72 defines a first channel 78. The second intermediate support 76 in combination with the first intermediate support 74 defines a second channel 80. Second channel 80 communicates between the end cap air intake 16 and the slot 30. While FIGS. 13-16 illustrate use of two intermediate supports 74, 76, any suitable number of intermediate supports may be used.

Figure 17:
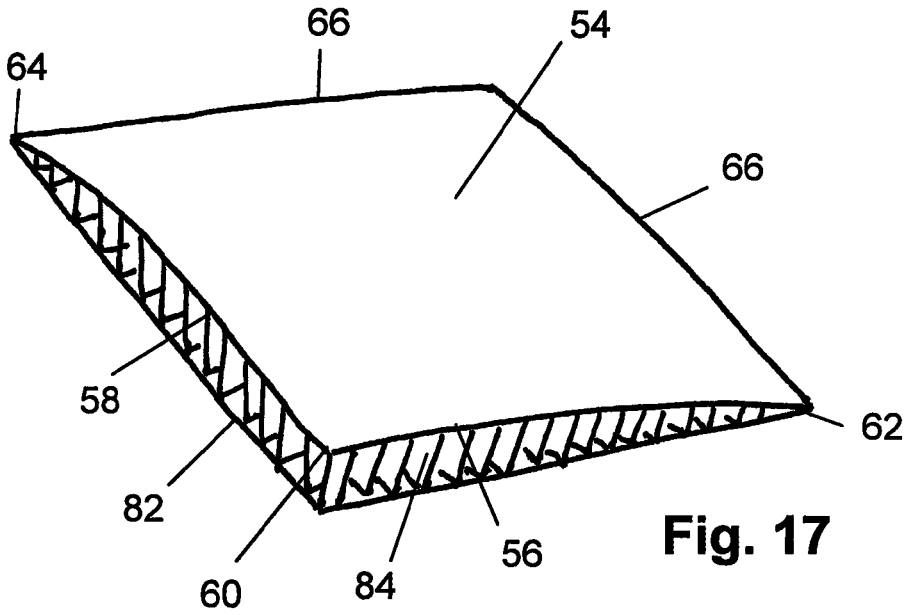
FIG. 17 is a perspective view of an end cap having a molded top and bottom.
Figure 18:
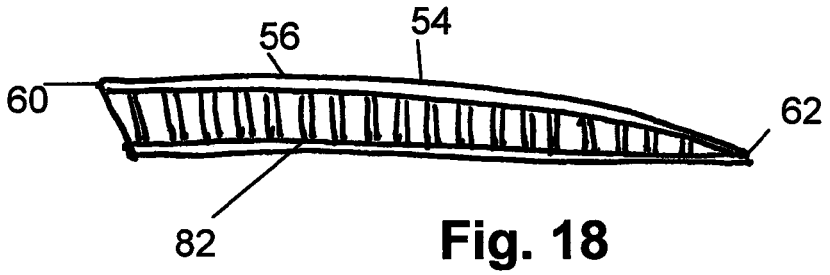
FIG. 18 is a side view of the first side of the end cap of FIG. 17.
Figure 19:
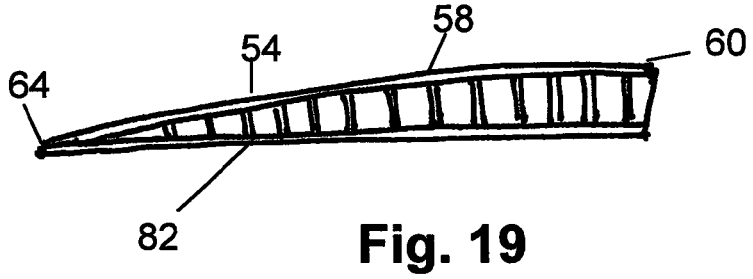
FIG. 19 is a side view of the second side of the end cap of FIG. 17.

FIGS. 17-19 illustrate an embodiment constructed using any suitable conventional molding technology, such as injection molding of a polymer. A molded end cap base 82 is joined to a molded end cap shingle supporting surface 54 to form the end cap 10. The end cap 10 of the embodiment of FIGS. 17-19 optionally may be provided with an end cap air intake 16 in communication with slot 30. The molded end cap 10 of FIGS. 17-19 may be provided with a molded grill 84 to support the end cap shingle supporting surface 54 and to reduce entry of insects or debris into the end cap 10 and hence into slot 30. The taper of the end cap shingle supporting surface 54 and hence the first edge 56 and second edge 58 from the spaced apart relation 46 at the first corner 60 to the "close relation," as defined above, at ends 62, 64 and other edges 66 may be curved, as illustrated by FIGS. 19 and 20.

Figure 20:
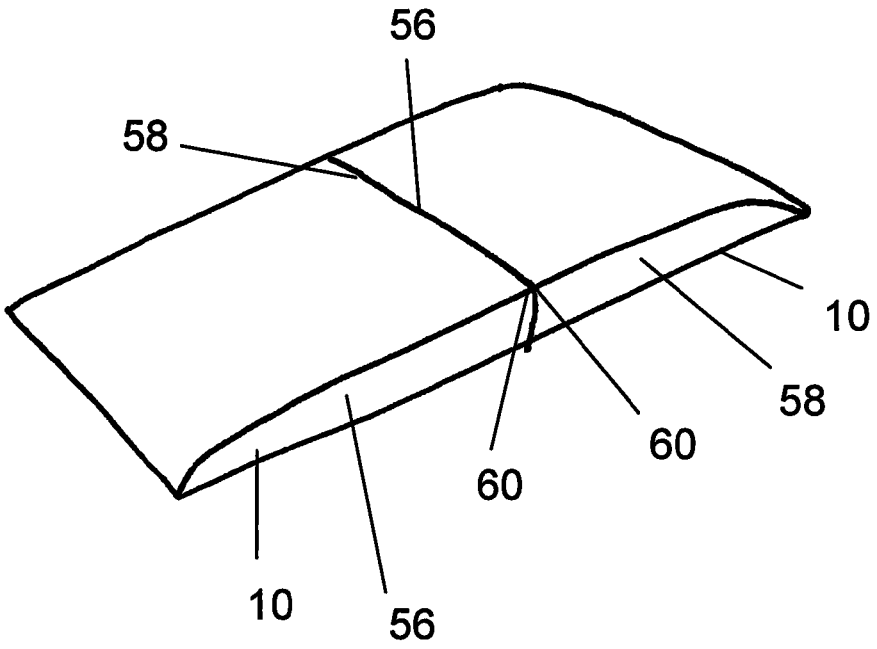
FIG. 20 is a perspective view of an end cap joined to another end cap.
Figure 21:
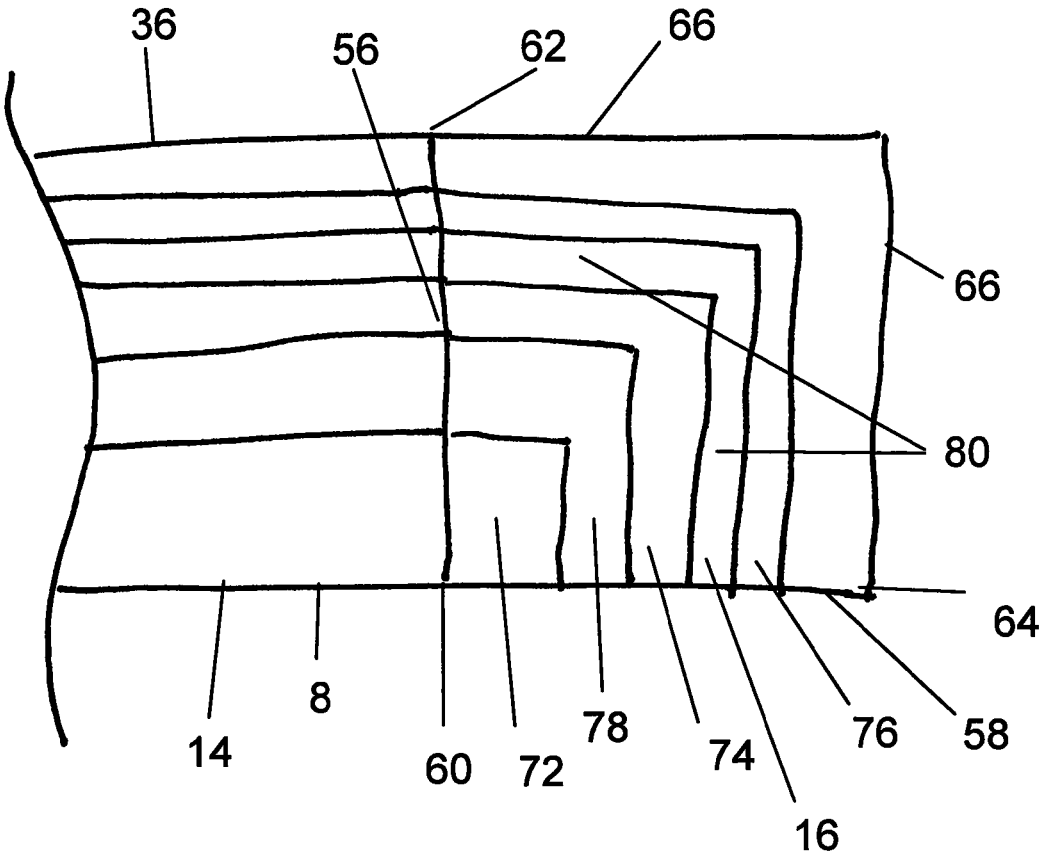
FIG. 21 is a bottom view of an end cap joined to an elongated vent.

FIGS. 20 and 21 illustrate an end cap 10 integral to another end cap 10 or integral to an elongated vent 8. FIG. 20 is a perspective view of two of the molded plastic end caps 110 as illustrated by FIGS. 17-19 that are molded so that the first edge 56 of one end cap 10 is joined to the second edge 58 of the other end cap 10. To use the pair of end caps 10 as illustrated by FIG. 20, the end user will cut the two end caps 10 apart, as with a razor knife or shears. The end caps 10 then are used as described above relating to FIGS. 1-19. Of course, any part of each end cap 10 maybe manufactured so that the part is connected to a part of another end cap 10, and the parts separated for use, including the end caps illustrated by FIGS. 9-16 and described above.

FIG. 21 is a bottom view of the end cap of FIG. 16 manufactured as a single unit along with an elongated vent 8. The end user may install the end cap 10 and the elongated vent 8 together on the roof deck, as described above. Alternatively, the end user may cut the end cap 10 and the elongated vent 8 apart, as with a razor knife or shears. If the end cap 10 and elongated vent 8 are separated, then the end user may install the elongated vent 8 as described above and may install the end cap at either end of the elongated vent.

Figure 22:
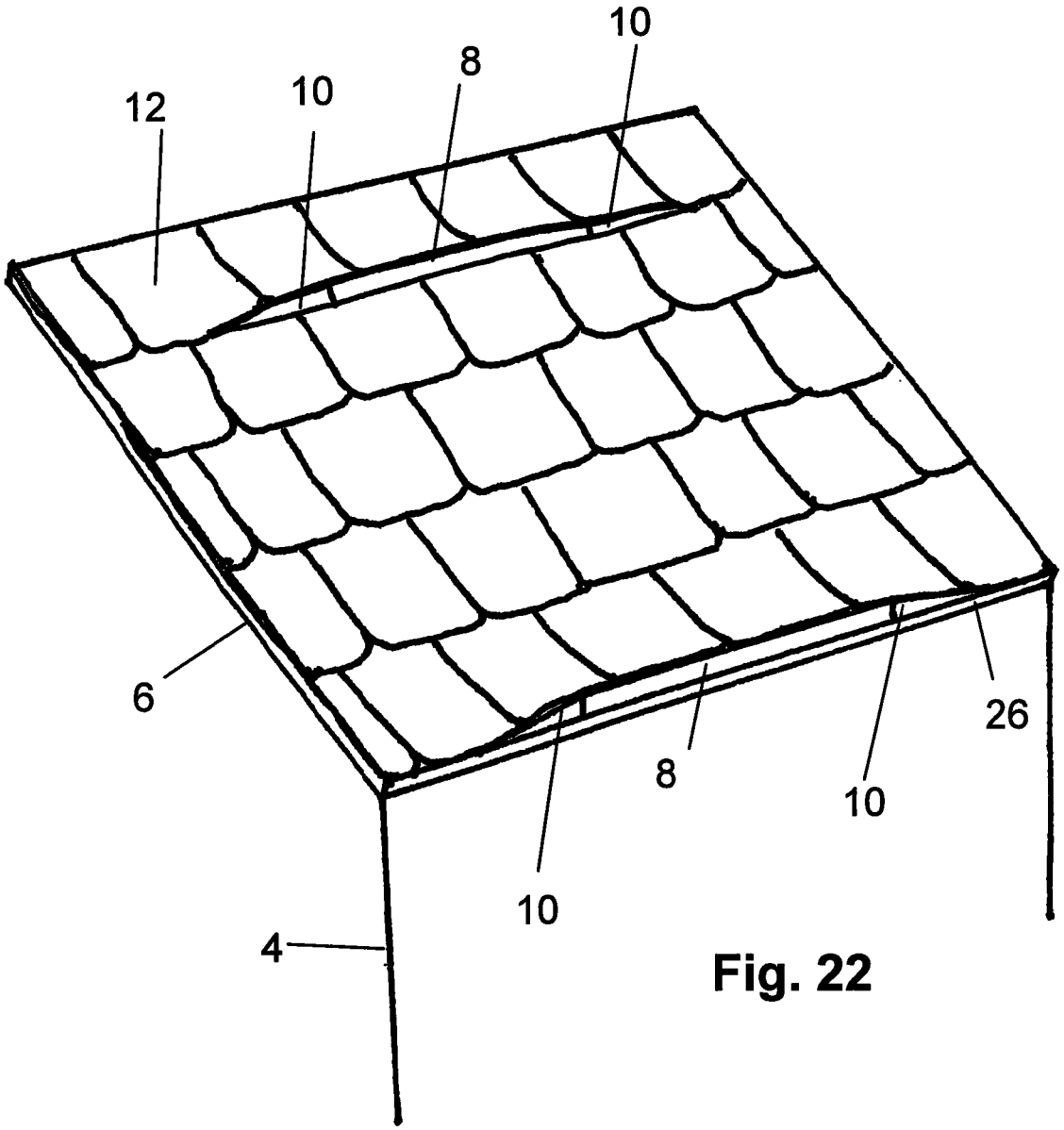
FIG. 22 is a perspective view of a roof having an end cap installed at a location other than the edge of the roof deck.

FIG. 22 is a perspective view of a roof 2 incorporating the end cap 10 along with an elongated vent 8 at a location other that the roof edge 26. The end caps 10 and elongated vent 8 are depicted by FIG. 22 as located proximal to the roof peak and to the roof edge, but the elongated vent 8 and end cap 10 may located anywhere on roof deck 6 that is in need of ventilation.

Figure 23:
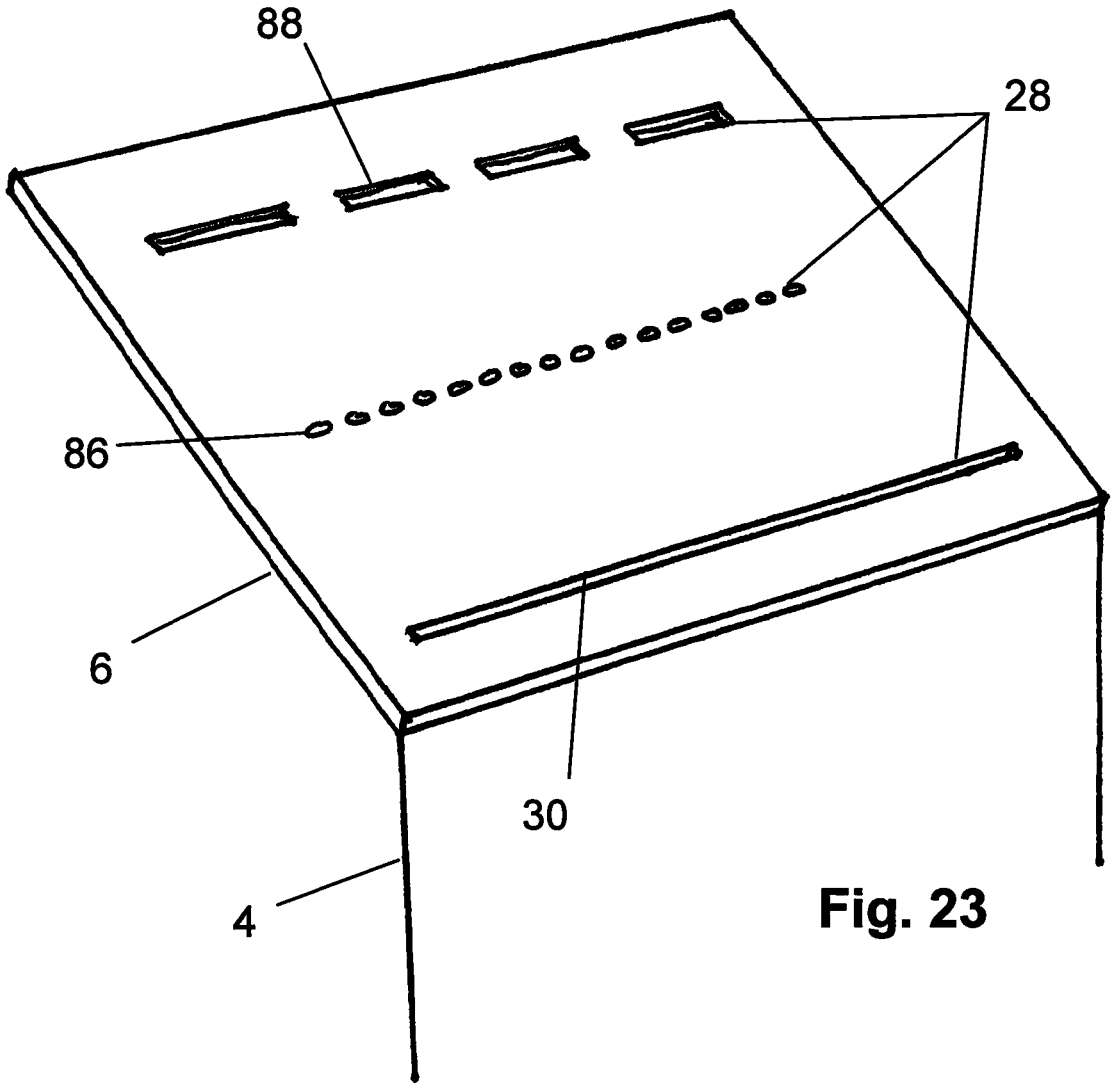
FIG. 23 is a perspective view of the roof deck showing different configurations of the opening.

FIG. 23 illustrates different configurations for opening 28 communicating through roof deck 6. Opening 28 may be a continuous slot 30. Other suitable shapes for opening 28 may include a row of drilled holes 86 and a series of 'wafer cuts' 88. The holes in the row of drilled holes 86 may be any suitable size, but holes having a diameter of 1.25 inches to 1.75 inches have proved suitable in practice. In a 'wafer cut,' a slot 30 is interrupted by sections of undisturbed roof deck 6 to render the roof deck 6 more rigid than a continuous slot 30. For example, a series of 'wafer cuts' 88 for a roof 2 with rafters on twenty-two inch centers may feature a row of slots each fourteen inches long and separated one from the other by eight inch widths of undisturbed roof deck 6, with each undisturbed portion of the roof deck 6 spanning a rafter.

In each of the opening 28 configurations of FIG. 23, the openings 28 are configured to be horizontal; that is, the slot 30, row of holes 86 or series of wafer cuts 88 are oriented generally normal to a line running through the gravitational center of the Earth. The horizontal orientation of opening 28 reduces the chance of rain water or snow melt entering the elongated vent or the end cap. In most instances, the opening 28 will be horizontal when it is parallel to the roof edge 26. The correct orientation of the opening 28 can be readily determined with a spirit level.

Figure 24:
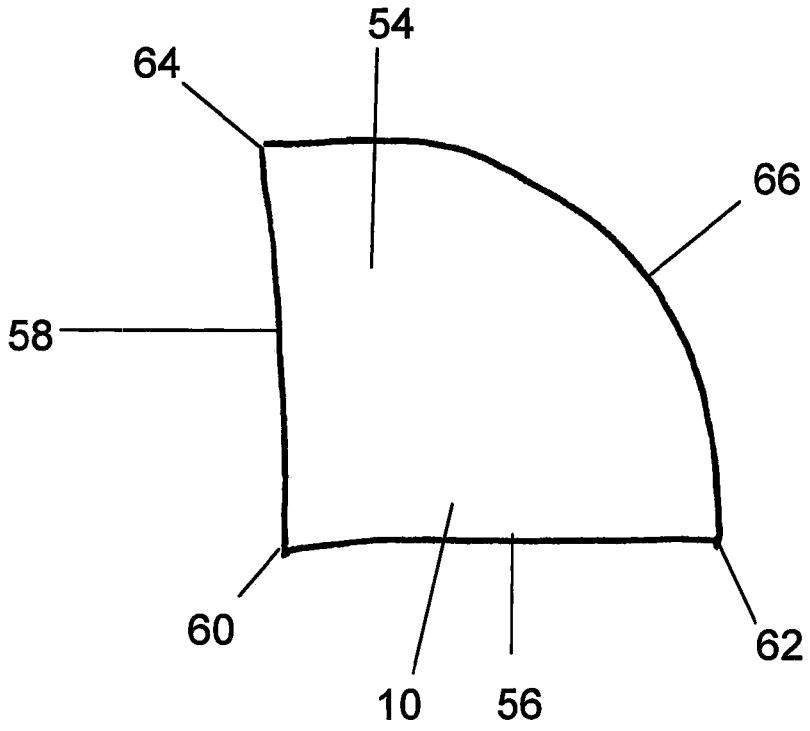
FIG. 24 is a plan view of an end cap having an 'other' edge.

FIG. 24 shows an end cap in plan that defines a shape other than a square or rectangle. The first and second edges 56, 58 define the first corner 60. The ends 62, 64 of the first and second edges 56, 58 that are opposite to the first corner 60 define the termination of the other edge 66. The other edge 66 and ends 62, 64 are in a "close relation" (as defined above) to the top surface 18 of the roof deck 6. As shown by [FIG.] *FIGS.* 24 *through 32*, the other edge 66 along with first and second edges 56, 58 can define any suitable shape in plan, such as a quadrant, rectangle, square, triangle, or other polygon.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

I claim:

1. A ventilated roof apparatus, the apparatus comprising:

a. a roof deck, said roof deck being pitched, said roof deck having a top surface, said top surface defining an opening, said opening communicating through said roof deck;

b. an elongated vent, said elongated vent engaging said top surface of said roof deck, said elongated vent having a length in a horizontal direction, said elongated vent having a width normal to said horizontal direction and parallel to said top surface of said roof deck, said length being greater than said width, said elongated vent comprising a vent shingle-supporting surface, said elongated vent and said vent shingle-supporting surface having an uphill side, a downhill side, a first end and a second end, said downhill side of said vent shingle-supporting surface being in a spaced-apart relation to said roof deck, said downhill side of said elongated vent defining a vent air inlet or exhaust, said elongated vent defining an interior volume, said vent air inlet or exhaust communicating with said opening through said interior volume, said uphill side of said vent shingle-supporting surface being in a close relation to said top surface of said roof deck;

c. an end cap, said end cap comprising an end cap shingle-supporting surface having a first edge and a second edge, said first and said second edges in combination defining a first corner, a one of said first edge and said second edge being located adjacent to said first end of said elongated vent, said first corner being located adjacent to said downhill side of said elongated vent, said first corner being in said spaced-apart relation to said roof deck, said spaced apart relation of said first corner to said roof deck being equivalent to said spaced apart relation of said downhill side of said vent shingle supporting surface to said roof deck, said first edge and said second edge each having an end opposite to said first corner, said end of each of said first edge and said second edges opposite to said first corner being in said close relation to said top surface of said roof deck, said first edge and said second edge each defining an edge length, each of said first and second edges defining an included angle with respect to said top surface of said roof deck at at least one location along said edge length of said first edge and said second edge, said angle being acute at said at least one location;

d. a shingle, said shingle spanning said vent shingle supporting surface and said end cap shingle supporting surface, said shingle being supported by said vent cap shingle supporting surface and said end cap shingle supporting surface.

2. The ventilated roof apparatus of claim 1 wherein said end cap shingle supporting surface being configured to support one or more shingles spanning said elongated vent shingle supporting surface at said first end and said roof deck and to substantially prevent a breakage of said one or more shingles due to a change in elevation of said one or more shingles between said vent shingle supporting surface and said roof deck in an ordinary and expected use.

3. The ventilated roof apparatus of claim 1 wherein said one of said first edge and said second edge has an edge length, said edge length of said one of said first and said second edges is equal to said width of said elongated vent.

4. [A ventilated roof apparatus, the apparatus comprising:

a. a roof deck, said roof deck being pitched, said roof deck having a top surface, said top surface defining an opening, said opening communicating through said roof deck;

b. an elongated vent, said elongated vent engaging said top surface of said roof deck, said elongated vent having a length in a horizontal direction, said elongated vent having a width normal to said horizontal direction and parallel to said top surface of said roof deck, said length being greater than said width, said elongated vent comprising a vent shingle-supporting surface, said elongated vent and said vent shingle-supporting surface having an uphill side, downhill side, a first end and a second end, said downhill side of said vent shingle-supporting surface being in a spaced-apart relation to said roof deck said downhill side of said elongated vent defining a vent air inlet or exhaust, said elongated vent defining an interior volume, said vent air inlet or exhaust communicating with said opening through said interior volume, said uphill side of said vent shingle-supporting surface being in a close relation to said top surface of said roof deck;

c. an end cap, said end cap comprising an end cap shingle-supporting surface having a first edge and a second edge, said first and said second edges in combination defining a first corner, a one of said first edge and said second edge being located adjacent to said first end of said elongated vent, said first corner being located adjacent to said downhill side of said elongated vent, said first corner being in said spaced-apart relation to said roof deck, said spaced apart relation of said first corner to said roof deck being equivalent to said spaced apart relation of said downhill side of said vent shingle supporting surface to said roof deck, said first edge and said second edge each having an end opposite to said first corner said end of each of said first edge and said second edges opposite to said first corner being in said close relation to said top surface of said roof deck;

d. a shingle, said shingle spanning said vent shingle supporting surface and said end cap shingle supporting surface, said shingle being supported by said vent cap shingle supporting surface and said end ca shingle supporting surface wherein said one of said first edge and said second edge has an edge length, said edge length of said one of said first and said second edges is equal to said width of said elongated vent and] *The ventilated roof apparatus of claim 1* wherein said edge length of said first edge is equal to said edge length of said second edge.

5. The ventilated roof apparatus of claim 1 wherein an other of said first and said second edges is in said spaced apart relation to said roof deck, said spaced-apart relation of said other of said first and said second edges to said roof deck descending in elevation from said first corner to said other end of said other of said first and said second edges, said spaced-apart relation of said other of said first and said second edges and said roof deck defining an end cap air inlet or exhaust, said end cap air inlet or exhaust being in fluid communication with said opening, said opening being selected from a group consisting of a slot, a row of drilled holes and a series of wafer cuts.

6. The ventilated roof apparatus of claim 1 wherein said end cap is one of a pair of said end caps, an other of said pair of said end caps having said shingle-supporting surface, said first edge and said second edge, said first and said second edges of said other of said pair of said end caps defining said first corner of said other of said pair of end caps, said other of said pair of end caps being located adjacent to said second end of said elongated air vent, said first corner of said other of said pair of end caps being located adjacent to said downhill side of said vent shingle supporting surface, said shingle being a one of a plurality of said shingles, another of said plurality of said shingles overlapping said second end of said elongated vent and said shingle supporting surface of said other of said pair of end caps.

7. The ventilated roof apparatus of claim 1 wherein said end cap is a one of a pair of said end caps, said other of said pair of said end caps having said shingle-supporting surface, said first edge and said second edge, said first and said second edges of said other of said pair of said end caps defining said first corner of said other of said pair of end caps, said other of said pair of end caps being located adjacent to said second end of said elongated vent, said first corner of said other of said pair of end caps being located adjacent to said downhill side of said vent shingle supporting surface and wherein said shingle being a one of a plurality of said shingles, another of said plurality of said shingles overlapping said second end of said elongated vent and said shingle supporting surface of said other of said pair of end caps wherein said pair of said end caps are interchangeable one for the other.

8. The ventilated roof apparatus of claim 4 wherein said end cap further comprises: a base, said base and said end cap shingle-supporting surface being molded from a polymer, said base being attached to said end cap shingle-supporting surface, said base engaging said roof deck, said base supporting said end cap shingle-supporting surface.

9. The ventilated roof apparatus of claim 1 wherein said end cap further comprises: a first corner support configured to support said first corner is said spaced-apart relation to said first corner of said top surface of said roof deck.

10. The ventilated roof apparatus of claim 9 wherein said end cap further comprises:

a. a first intermediate support located along said first edge between said first corner and said end of said first edge opposite to said first corner;

b. a second intermediate support located along said second edge between said first corner and said end of said second edge opposite to said first corner.

11. The ventilated roof apparatus of claim 10 wherein said first intermediate support and said first corner support define a first channel, said second intermediate support and said first corner define a second channel, a one of said first and said second channels defining an end cap air inlet or exhaust, said opening comprising a slot, said one of said first and said second channels being in said fluid communication with said slot when said first edge is located adjacent to said first end of said elongated vent and when said second edge is located adjacent to said second end of said elongated vent.

12. The ventilated roof apparatus of claim 11 wherein a one of said first and said intermediate supports is proximal to said first corner and an other of said first and said second intermediate supports is proximal to said end of said first or said second edge opposite to said first corner, said one of said first and said second intermediate supports proximal to said first corner supporting said end cap shingle supporting surface at a greater spaced apart relation to said top surface of said roof deck than said other of said first and said second intermediate supports.

13. The ventilated roof apparatus of claim 4 wherein said an other of said first and said second edges is in said spaced apart relation to said roof deck, said spaced-apart relation of said other of said first and said second edge and said roof deck does not define an end cap air inlet or exhaust.

14. The ventilated roof apparatus of claim 1 wherein said end cap is integral to said elongated vent.

15. The ventilated roof apparatus of claim 1 wherein said end cap is composed of a material selected from a list consisting of plastic, a metal, a wood, a wire and a fiber.

16. A method for ventilating a structure, the method comprising:

a. preparing an opening, said opening being defined by a roof deck, said roof deck being pitched, said roof deck having a top surface, said opening communicating through said roof deck;

b. providing an elongated vent, said elongated vent engaging said top surface of said roof deck, said elongated vent having a length in a horizontal direction, said elongated vent having a width normal to said horizontal direction and parallel to said top surface of said roof deck, said length being greater than said width, said elongated vent comprising an elongated vent shingle-supporting surface, said elongated vent and said vent shingle-supporting surface having an uphill side, a downhill side, a first end and a second end, said downhill side of said elongated vent shingle-supporting surface being in a spaced-apart relation to said top surface of said roof deck, said downhill side of said elongated vent defining a vent air inlet or exhaust, said elongated vent defining an interior volume, said vent air intake inlet or exhaust communicating with said opening through said interior volume, said uphill side of said vent shingle-supporting surface being in a close relation to said roof deck;

c. providing an end cap, said end cap comprising an end cap shingle-supporting surface having a first edge and a second edge, said first and said second edges in combination defining a first corner, a one of said first edge and said second edge being located adjacent to said first end of said elongated vent, said first corner being located adjacent to said downhill side of said elongated vent, said first corner being in said spaced-apart relation to said roof deck, said spaced apart relation of said first corner to said roof deck being equivalent to said spaced apart relation of said downhill side of said elongated vent shingle supporting surface to said roof deck, said first edge and said second edge each having an end opposite to said first corner, said end of each of said first edge and said second edge opposite to said first corner being in said close relation to said top surface of said roof deck, said first edge and said second edge each defining an edge length, each of said first and second edges defining an included angle with respect to said top surface of said roof deck at at least one location along said edge length of said first edge and said second edge, said angle being acute at said at least one location;

d. providing a shingle, said shingle spanning said uphill side of said vent shingle supporting surface and said end cap shingle supporting surface, said shingle being supported by said vent shingle supporting surface and said end cap shingle supporting surface.

17. The method of claim 16 wherein said end cap defines an other edge between said ends of said first edge and second edge opposite to said first corner, said other edge being in said close relation to said roof deck.

18. The method of claim 17 wherein said length of said first edge is equal to said length of said second edge.

19. The method of claim 18 wherein said end cap is a one of a pair of said end caps, an other of said pair of end caps having said shingle-supporting surface, said first edge and said second edge, said first and said second edges of said other of said pair of said end caps defining said first corner of said other of said pair of end caps, said other of said pair of end caps being located adjacent to said second end of said elongated vent, said first corner of said other of said pair of end caps being located adjacent to said downhill side of said vent shingle supporting surface, said shingle being a one of a plurality of said shingles, another of said plurality of said shingles overlapping said second end of said elongated vent, said shingle supporting surface of said other of said pair of end caps and said top surface of said roof deck.

20. The method of claim 19 wherein each of said end caps of said pair are interchangeable one for the other.

21. The method of claim 20 wherein said other of said first and said second edges is in said spaced apart relation to said top surface of said roof deck, said spaced-apart relation descending in elevation from said first corner to said end of said other of said first and said second edges opposite to said first corner, said spaced-apart relation of said other of said first and said second edge and said top surface of said roof deck defining an end cap air inlet or exhaust, said end cap air inlet or exhaust being in fluid communication with said opening.

22. The method of claim 20 wherein said other of said first and said second edges is in said spaced apart relation to said top surface of said roof deck, said spaced-apart relation descending in elevation from said first corner to said end of said other of said first and said second edges opposite to said first corner, said spaced-apart relation of said other of said first and said second edge and said top surface of said roof deck does not define an end cap air inlet or exhaust.

23. The method of claim 20 wherein said step of preparing said opening is selected from a list consisting of cutting a slot, drilling a row of holes and preparing a series of wafer cuts.

24. The method of claim 19 wherein said pair of end caps are attached one to the other, the step of providing said end cap comprising: separating said pair of end caps said one from said other.

25. The method of claim 16 wherein said end cap is attached to said elongated vent, said step of providing said end cap comprising: providing said elongated vent with said end cap attached.

26. The apparatus of claim 1 wherein said end cap shingle supporting surface defines an at least one other edge opposite to said first corner, said at least one other edge being in said close relation to said roof deck, said end cap shingle supporting surface being configured to provide support to said shingle between said end of said elongated vent and said top surface of said roof deck to prevent a failure of said shingle due to a lack of support in an ordinary and expected use.

27. [A ventilated roof apparatus, the apparatus comprising:

a. a roof deck, said roof deck being pitched, said roof deck having a top surface, said top surface defining an opening, said opening communicating through said roof deck;

b. an elongated vent, said elongated vent engaging said top surface of said roof deck, said elongated vent having a length in a horizontal direction, said elongated vent having a width normal to said horizontal direction and parallel to said top surface of said roof deck, said length being greater than said width, said elongated vent comprising a vent shingle-supporting surface, said elongated vent and said vent shingle-supporting surface having an uphill side, downhill side, a first end and a second end, said downhill side of said vent shingle-supporting surface being in a spaced-apart relation to said roof deck said downhill side of said elongated vent defining a vent air inlet or exhaust, said elongated vent defining an interior volume, said vent air inlet or exhaust communicating with said opening through said interior volume, said uphill side of said vent shingle-supporting surface being in a close relation to said top surface of said roof deck;

c. an end cap, said end cap comprising an end cap shingle-supporting surface having a first edge and a second edge, said first and said second edges in combination defining a first corner, a one of said first edge and said second edge being located adjacent to said first end of said elongated vent, said first corner being located adjacent to said downhill side of said elongated vent, said first corner being in said spaced-apart relation to said roof deck, said spaced apart relation of said first corner to said roof deck being equivalent to said spaced apart relation of said downhill side of said vent shingle supporting surface to said roof deck said first edge and said second edge each having an end opposite to said first corner said end of each of said first edge and said second edges opposite to said first corner being in said close relation to said top surface of said roof deck;

d. a shingle, said shingle spanning said vent shingle supporting surface and said end cap shingle supporting surface, said shingle being supported by said vent cap shingle supporting surface and said end cap shingle supporting surface] *The ventilated roof apparatus of claim 1* wherein said first edge and said second edge each defining an edge length, each of said first and second edges defining an included angle with respect to said top surface of said roof deck at each location along said edge length of said first edge and said second edge, said angle being acute at each location along said edge length of said first edge and said second edge.

28. The apparatus of claim 1 wherein said first corner and said end cap shingle supporting surface defining generally a hypotenuse of a right triangle, said right triangle having a first leg and a second leg, said first leg being parallel to said roof deck, said second leg being normal to said roof deck, said first leg being longer than said second leg.

29. The ventilated roof apparatus of claim 1 wherein said end cap shingle supporting surface defines a taper between said first corner and said other end of said first edge and defining said taper between said first corner and said other end of said second edge, said taper being selected to support said shingle between said first end of said elongated vent and said roof deck.

30. The ventilated roof apparatus of claim 29 wherein said taper between said first corner and said other end of said first edge is substantially equal to said taper between said first corner and said other end of said second edge.

31. The ventilated roof apparatus of claim 30 wherein said taper is selected to substantially prevent a breakage of said one more shingles due to a change in elevation of said one or more shingles between said vent shingle supporting surface and said roof deck.

32. The ventilated roof apparatus of claim 29 wherein said taper defines a curve.

33. The ventilated roof apparatus of claim 28 wherein one or both of said first edge and said second edge defines a curve.

34. The ventilated roof apparatus of claim 1 wherein one or both of said first edge and said second edge defines a curve or is substantially straight.

35. The ventilated roof apparatus of claim 29 wherein said end cap does not define an air inlet or exhaust.

36. The ventilated roof apparatus of claim 28 wherein said end cap does not define an air inlet or exhaust.

37. The ventilated roof apparatus of claim 1 wherein said end cap defines an air inlet or exhaust.

38. The ventilated roof apparatus of claim 1 wherein said end cap does not define an air inlet or exhaust.

*39. A tapered end cap for use with an elongated vent on a pitched roof, the elongated vent defining a vent shingle-supporting surface, the elongated vent and the vent shingle-supporting surface having an uphill side, a downhill side and a first end, the shingle-supporting surface at the downhill side being in a spaced apart relation to the roof, the shingle-supporting surface at the uphill side being in a close relation to the roof, the elongated vent at the downhill side defining a vent air intake or exhaust, the vent air intake or exhaust being in fluid communication through the roof, the tapered end cap comprising: an end cap shingle-supporting surface having a first edge and a second edge, said first and said second edges in combination defining a first corner, a one of said first edge and said second edge being configured to be located adjacent to the first end of the elongated vent at the downhill side of said elongated vent when the tapered end cap is installed on the roof, said first corner being in a spaced-apart relation to the roof when the tapered end cap is installed on the roof, said spaced apart relation of said first corner to the roof being equivalent to the spaced apart relation of the downhill side of said vent shingle-supporting surface to the roof, said first edge and said second edge each having an end opposite to said first corner, each of said first edge and said second edge opposite to said first corner being configured to be in the close relation to the roof when the tapered end cap is installed on the roof, said first and second edges each defining an edge length, each of said first and second edges is configured to define an included angle with respect to the roof for at least one location along said edge length of said first edge and said second edge when the tapered end cap is installed on the roof, said angle being acute at said at least one location, said end cap shingle-supporting surface being configured to support a shingle spanning the vent shingle-supporting surface and said end cap shingle-supporting surface when the tapered end cap is installed on the roof, wherein said shingle is supported by said elongated vent shingle-supporting surface and said end cap shingle-supporting surface.*

*40. The tapered end cap of claim 39 wherein said end cap shingle-supporting surface is configured to support one or more shingles spanning the elongated vent shingle-supporting surface and the roof at the first end of the elongated vent and to substantially prevent a breakage of said one or more shingles due to a change in elevation of said one or more shingles between the vent shingle-supporting surface and the roof in an ordinary and expected use.*

*41. The tapered end cap of claim 39 wherein said one of said first edge and said second edge has an edge length, said*

*edge length of said one of said first and said second edges is equal to said width of said elongated vent.*

*42. The tapered end cap of claim 39 wherein said edge length of said first edge is equal to said edge length of said second edge.*

*43. The tapered end cap of claim 39 wherein an other of said first and said second edges is in said spaced apart relation to the roof, said spaced-apart relation of said other of said first and said second edges to the roof descending in elevation from said first corner to said other end of said other of said first and said second edges, said spaced-apart relation of said other of said first and said second edges and the roof defining an end cap air inlet or exhaust, said end cap air inlet or exhaust being configured for fluid communication through the roof when the end cap is installed on the roof.*

*44. The tapered end cap of claim 39 wherein the end cap is a one of a pair of end caps, said other of said pair of end caps being configured to be located adjacent to a second end of said elongated vent, wherein the end caps of said pair of said end caps are configured to be interchangeable one for the other.*

*45. The tapered end cap of claim 39 wherein the end cap further comprises: a base, said base and said end cap shingle-supporting surface being molded from a polymer, said base being attached to said end cap shingle-supporting surface, said base being configured to engage the roof, said base supporting said end cap shingle-supporting surface.*

*46. The tapered end cap of claim 39 wherein the end cap further comprises: a first corner support configured to support said first corner is said spaced-apart relation to said top surface of the roof.*

*47. The tapered end cap of claim 46 wherein the end cap further comprises:*

*a. a first intermediate support located along said first edge between said first corner and said end of said first edge opposite to said first corner;*

*b. a second intermediate support located along said second edge between said first corner and said end of said second edge opposite to said first corner.*

*48. The tapered end cap of claim 47 wherein said first intermediate support and said first corner support define a first channel, said second intermediate support and said first corner define a second channel, a one of said first and said second channels defining an end cap air inlet or exhaust, said end cap inlet or exhaust being configured to be in fluid communication through the roof when said first edge is located adjacent to said first end of said elongated vent and when said second edge is located adjacent to said second end of said elongated vent.*

*49. The tapered end cap of claim 48 wherein a one of said first and said intermediate supports is proximal to said first corner and an other of said first and said second intermediate supports is proximal to said end of said first or said second edge opposite to said first corner, said one of said first and said second intermediate supports proximal to said first corner supporting said end cap shingle-supporting surface at a greater spaced apart relation to said top surface of the roof than said other of said first and said second intermediate supports.*

*50. The tapered end cap of claim 43 wherein an other of said first and said second edges is in said spaced apart relation to the roof when the end cap is installed on the roof, said spaced-apart relation of said other of said first and said second edge and the roof does not define an end cap air inlet or exhaust.*

*51. The tapered end cap of claim 39 wherein the end cap is integral to said elongated vent.*

*52. The tapered end cap of claim 39 wherein the end cap is composed of a material selected from a list consisting of plastic, a metal, a wood, a wire and a fiber.*

*53. The tapered end cap of claim 39 wherein said end cap shingle-supporting surface defines an at least one other edge opposite to said first corner, said at least one other edge being in said close relation to the roof when the end cap is installed on the roof, said end cap shingle-supporting surface being configured to provide support to said shingle between said end of said elongated vent and said top surface of the roof to prevent a failure of said shingle due to a lack of support in an ordinary and expected use.*

*54. The tapered end cap of claim 39 wherein said first edge and said second edge each defining an edge length, each of said first and second edges defining an included angle with respect to said top surface of the roof at each location along said edge length of said first edge and said second edge, said angle being acute at each location along said edge length of said first edge and said second edge.*

*55. The tapered end cap of claim 39 wherein said first corner and said end cap shingle-supporting surface defining generally a hypotenuse of a right triangle, said right triangle having a first leg and a second leg, said first leg being parallel to the roof when the end cap is installed on the roof, said second leg being normal to the roof when the end cap is installed on the roof, said first leg being longer than said second leg.*

*56. The tapered end cap of claim 39 wherein said end cap shingle-supporting surface defines a taper between said first corner and said other end of said first edge and defining said taper between said first corner and said other end of said second edge, said taper being selected to support said shingle between said first end of said elongated vent and the roof when the end cap is installed on the roof.*

*57. The tapered end cap of claim 56 wherein said taper between said first corner and said other end of said first edge is substantially equal to said taper between said first corner and said other end of said second edge.*

*58. The tapered end cap of claim 57 wherein said taper is selected to substantially prevent a breakage of said one more shingles due to a change in elevation of said one or more shingles between said vent shingle-supporting surface and the roof when the end cap is installed on the roof.*

*59. The tapered end cap of claim 56 wherein said taper defines a curve.*

*60. The tapered end cap of claim 55 wherein one or both of said first edge and said second edge defines a curve.*

*61. The tapered end cap of claim 39 wherein one or both of said first edge and said second edge defines a curve or is substantially straight.*

*62. The tapered end cap of claim 56 wherein the end cap does not define an air inlet or exhaust.*

*63. The tapered end cap of claim 55 wherein the end cap does not define an air inlet or exhaust.*

*64. The tapered end cap of claim 39 wherein the end cap defines an air inlet or exhaust.*

*65. The tapered end cap of claim 39 wherein the end cap does not define an air inlet or exhaust.*

* * * * *